United States Patent
Rajagopalan

(10) Patent No.: US 12,468,560 B2
(45) Date of Patent: Nov. 11, 2025

(54) DELIVERING FULLY FEATURED NATIVE USER EXPERIENCE WITHIN A UNIFIED SOFTWARE SUITE

(71) Applicant: Zoho Corporation Private Limited, Chengalpattu Taluk (IN)

(72) Inventor: Sathish Rajagopalan, Chennai (IN)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 243 days.

(21) Appl. No.: 18/355,801

(22) Filed: Jul. 20, 2023

(65) Prior Publication Data
US 2024/0028352 A1     Jan. 25, 2024

Related U.S. Application Data

(60) Provisional application No. 63/376,635, filed on Sep. 22, 2022.

(30) Foreign Application Priority Data

Jul. 21, 2022 (IN) .............. 202241041827
Jul. 7, 2023 (IN) .............. 202341045728

(51) Int. Cl.
G06F 17/00 (2019.01)
G06F 9/451 (2018.01)
G06F 21/62 (2013.01)
G06F 40/295 (2020.01)
G06F 40/30 (2020.01)

(52) U.S. Cl.
CPC ............ *G06F 9/451* (2018.02); *G06F 21/629* (2013.01); *G06F 40/295* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 10,535,005 B1 * | 1/2020 | Badr ...................... | G06N 5/022 |
| 11,017,299 B1 * | 5/2021 | Badr ................... | G06F 3/04817 |
| 11,301,811 B2 * | 4/2022 | Marom ................ | G06F 16/909 |
| 11,301,814 B2 * | 4/2022 | Radzewsky ............ | G06N 5/022 |
| 11,410,128 B2 * | 8/2022 | Radzewsky ...... | G06Q 10/06312 |
| 11,501,255 B2 * | 11/2022 | Mann ................ | G06F 16/24564 |
| 2009/0100010 A1 | 4/2009 | Dargahi | |
| 2018/0373398 A1 | 12/2018 | Seixeiro | |

\* cited by examiner

*Primary Examiner* — Satwant K Singh
(74) *Attorney, Agent, or Firm* — AHMANN KLOKE LLP

(57) ABSTRACT

A unified software suite has been proposed to deliver a fully featured native user experience. The unified software suite supports smart mail, smart assistant, and smart flow system. The smart mail system presents quick and easy access to the entity within the user interface through a toggle switch. Thus, the smart mail system avoids context switches. The smart assistant system is a command line utility which helps users view information or execute one or more actions across various services based on their input. The smart flow system helps fluid movement of any Contextually Actionable (CA) entity types (files, contact or group of contacts, groups, text, hyperlinks, date/time, location) from an element in the user interface (source) to another element in the user interface (destination), using a drag and drop mechanism facilitated by mouse/trackpad in the user machine.

22 Claims, 30 Drawing Sheets

DELIVERING FULLY FEATURED NATIVE USER EXPERIENCE WITHIN A UNIFIED SOFTWARE SUITE

CROSS-REFERENCE TO RELATED APPLICATIONS

The present application claims priority to Indian Provisional Patent Application No. 202241041827 filed Jul. 21, 2022, Indian Provisional Patent Application No. 202341045728 filed Jul. 7, 2023, and U.S. Provisional Patent Application Ser. No. 63/376,635 filed Sep. 22, 2022, each of which is incorporated herein by reference.

BACKGROUND

Electronic mail is one of the most used services on the internet. It helps in transmitting and receiving messages and other information. The information is not restricted to textual but can also be images, videos etc. The email interface has many different software applications embedded in it. Efficiently managing emails along with the applications has been a challenge in today's scenario.

SUMMARY

The unified software suite blends all the powerful features of an email application (hereinafter referred to as "app") e.g., ZOHO Mail with the native medium as much as possible to enhance and personalize the user experience to fit everyone's needs. Native application is the software developed targeting a particular platform or operating system.

BRIEF DESCRIPTION OF THE DRAWINGS

FIG. 10 is a screenshot illustrating functioning of smart assistant when user prefers group communication.

DETAILED DESCRIPTION

A unified software suite delivers a fully featured native user experience. It is a bundle of software applications e.g. Mail, Chat, Calendar, Notes, Tasks, Streams, etc. Services provided by, e.g., ZOHO apps in the ZOHO ecosystem, are used for illustration purposes henceforth. Zoho Ecosystem in this application is comprised of multiple software applications which have been developed in the same environment.

The unified software suite facilitates users to configure and access multiple mail accounts from a single application and provides full offline and/or online access to emails and associated actions. It also empowers users for remote work by enabling easy and comprehensive collaboration.

A user can seamlessly touch base with co-workers and third-party collaborators with a software suite e.g., ZOHO Cliq. It can be accessed as a chat bar, as a module, or a separate window. The user can initiate audio calls, video calls, and even record and send out audio and video messages directly from his/her inbox.

The unified software suite will help in tracking events across multiple calendars, accessing floating sticky notes to jot down one's thoughts, adding tasks quickly and easily from the global menu bar, collaborating on one's emails, notes, and tasks using the streams feature.

Figure 1:
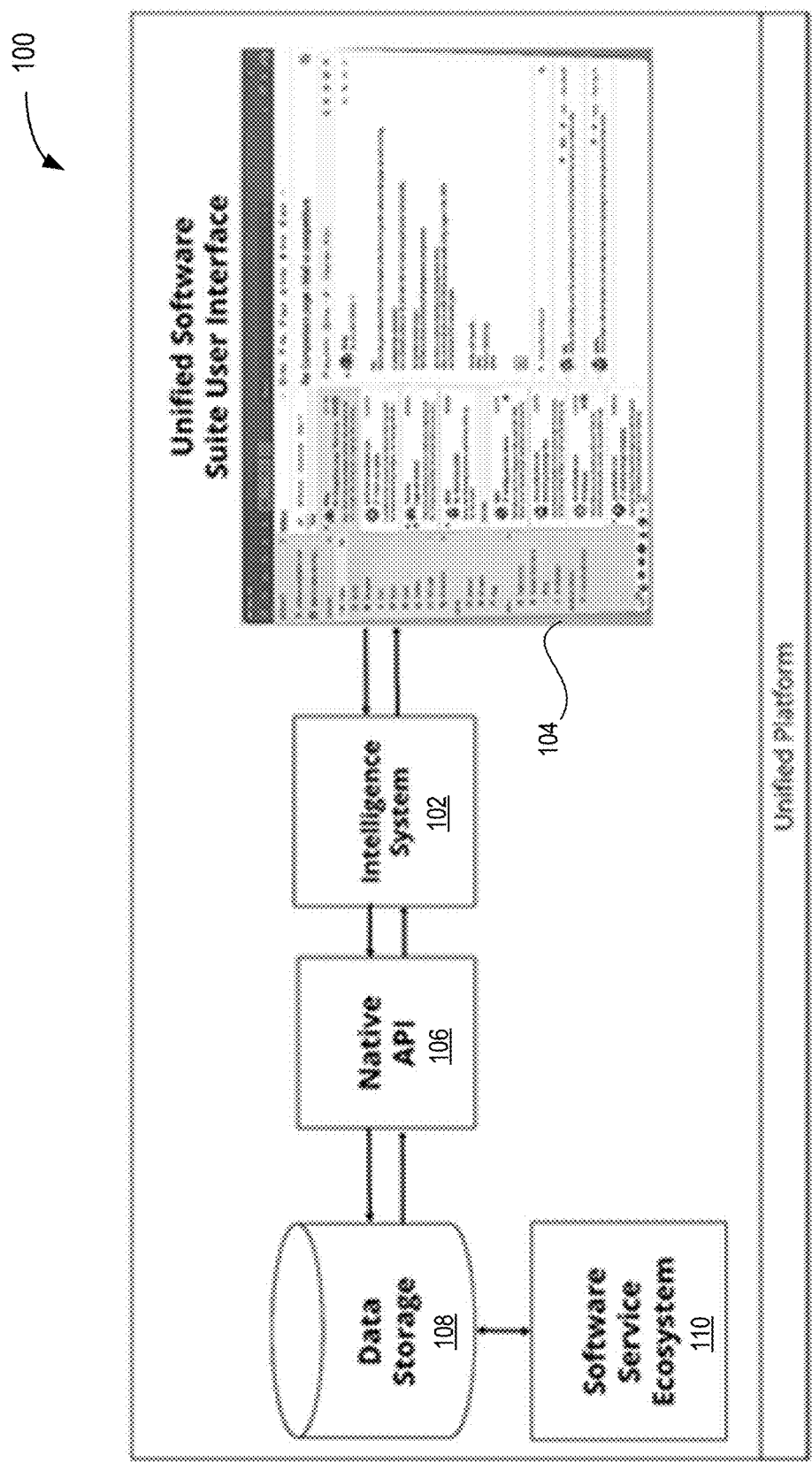
FIG. 1 is a diagram of an example of an overall architecture of a unified software suite.

FIG. 1 is a diagram 100 of an example of an overall architecture of a unified software suite. The diagram includes an intelligence system 102 coupled to a user interface 104 and a native application programming interface (API) 106. The intelligence system supports smart mail, smart assistant, widget and smart flow systems. The native API facilitates access to services provided by various applications. The Native API is coupled to a datastore 108 that comprises an offline datastore, session cache, and network adapters, which could be referred to as an application backend service datastore. In a specific implementation, the network adapters interact with services through "Hyper Text Transfer Protocol" (HTTP) sockets and Web Socket protocols. The datastore 108 is coupled to a software service ecosystem 110. The software service ecosystem includes a set of applications, tools etc.

In an example of operation, notification emails are triggered from various services based on various use case scenarios specific to the service. The services provided by the applications, e.g. ZOHO Projects (when a task or a bug is assigned to the user, when a colleague @mentions a user in a comment or status etc.), ZOHO CRM (when a Task or a Lead is assigned to the user, when the user is @mentioned in a note etc.), ZOHO Connect (when a post is made in a group that the user is part of, when the user is @mentioned in a post or a comment etc.), ZOHO Desk (when a customer ticket is assigned to the user, when the user is @mentioned in a ticket comment etc.), etc., have been used for illustration purpose.

In a specific implementation, when notification emails are received in an Inbox of a user, the user does a context switch for two purposes. The first one is to access the data/Entity for which the notification was delivered. The second purpose is to perform a course of action on the same data/Entity. This context switch typically happens by accessing a (web) link to the entity embedded within the email.

In a specific implementation, the smart mail system avoids such context switches to access and act on the entity in question. The smart mail system presents quick and easy access to the entity within the UI interface through a toggle switch. A smart mail manager in the smart mail engine maps the incoming notification emails to the respective entities across various services in the software ecosystem and presents controls to view relevant data alongside the notification email for instant data access and action.

For instance, when a user is assigned a customer ticket using an application e.g., ZOHO Desk service, then a notification is received in the user's inbox. The user can view the Ticket information right inside the smart mail UI, and act on the ticket by sending a reply. Hence the need to perform a context switch to open the ticket information in a separate web browser window is avoided.

Figure 2:
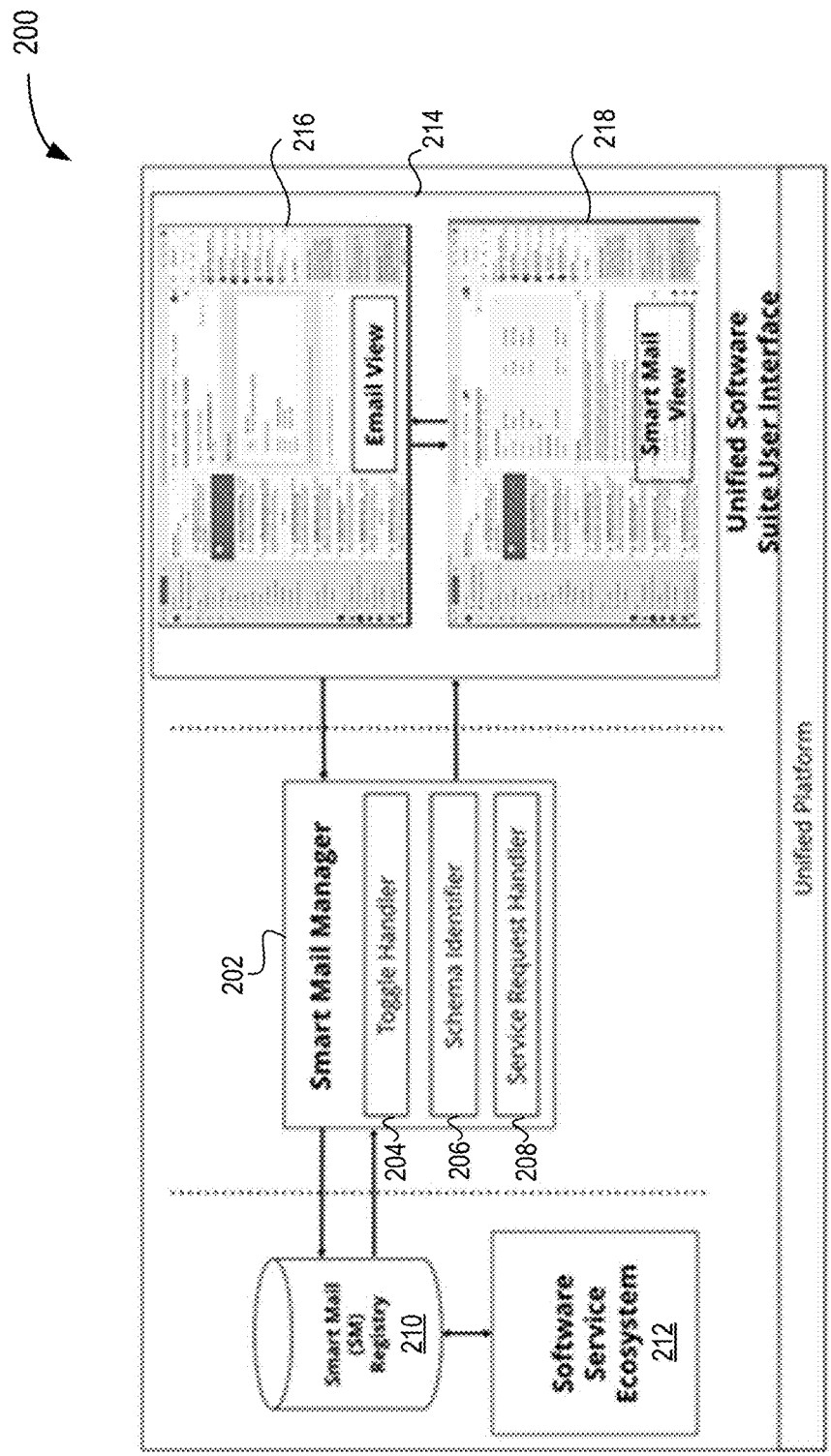
FIG. 2 is a diagram of an example of an architecture of a smart mail system.

FIG. 2 is a diagram 200 of an example of an architecture of a smart mail system. The diagram includes a smart mail manager 202 with a toggle handler 204, a schema identifier 206, and a service request handler 208. In an example of operation, when a user toggles smart mail view from email view, the toggle handler captures the request. The schema identifier identifies a schema in a mail API (not shown in FIG. 2); it extracts record ID from the schema in a smart mail (SM) registry datastore 210. The service request handler fetches record information for the record ID of the schema, from across the services in a software service ecosystem 212. The notification email is then previewed on a user interface in smart mail view. The user can perform actions on the notification email in smart mail, without switching to another application or tab.

The diagram 200 also includes a UI view manager 214 that provides the user with the ability to switch between an "email view" 216 and a smart mail view 218 (also called a "live data view"). In a specific implementation, the user can switch between the views by enabling a toggle switch. If a user has enabled toggle switch on the UI, then the UI view manager displays the notification email as a smart mail in "live data view". Else the email is displayed as a normal email in "email view".

The "email view" pertains to previewing an email simply on the UI. The smart mail view or "live data view" pertains to an entity (entity defines a task, bug, etc. inside a service) for which the notification email was triggered. In other words, the contents (e.g., live data) in the Smart mail view is contextual to the email notification. The user can view the notification email in its native form through "smart mail view" in the preview pane itself.

Figure 3:
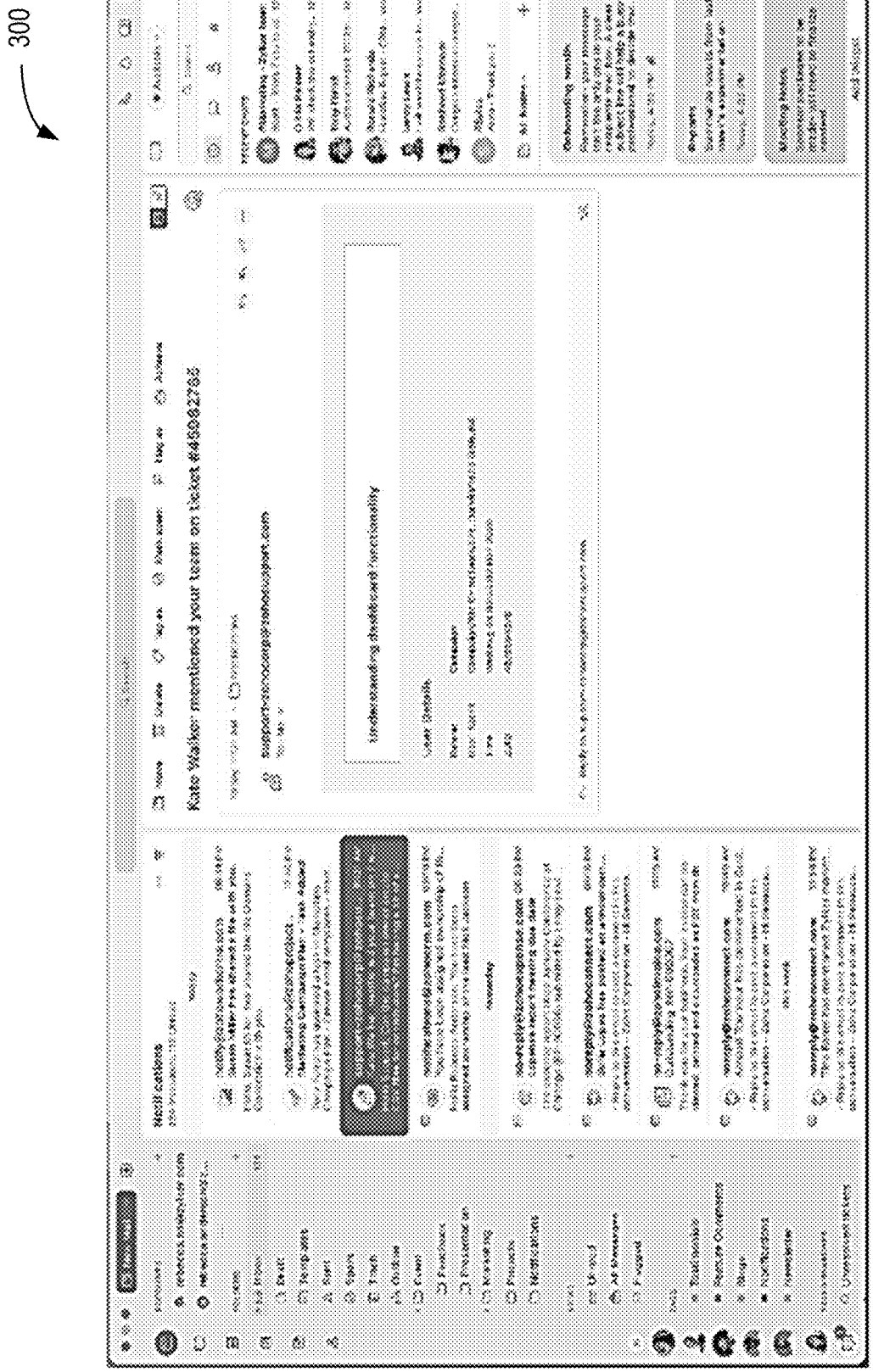
FIG. 3 is a screenshot illustrating a sample user interface in "Email view" of notification email from a help desk software.

The user can enable or disable the views as desired or required. The screenshot in FIG. 3 illustrates a sample user interface 300 of smart mail system in as "email view" of a notification email from a service provided by an application, e.g., ZOHO desk.

Figure 4:
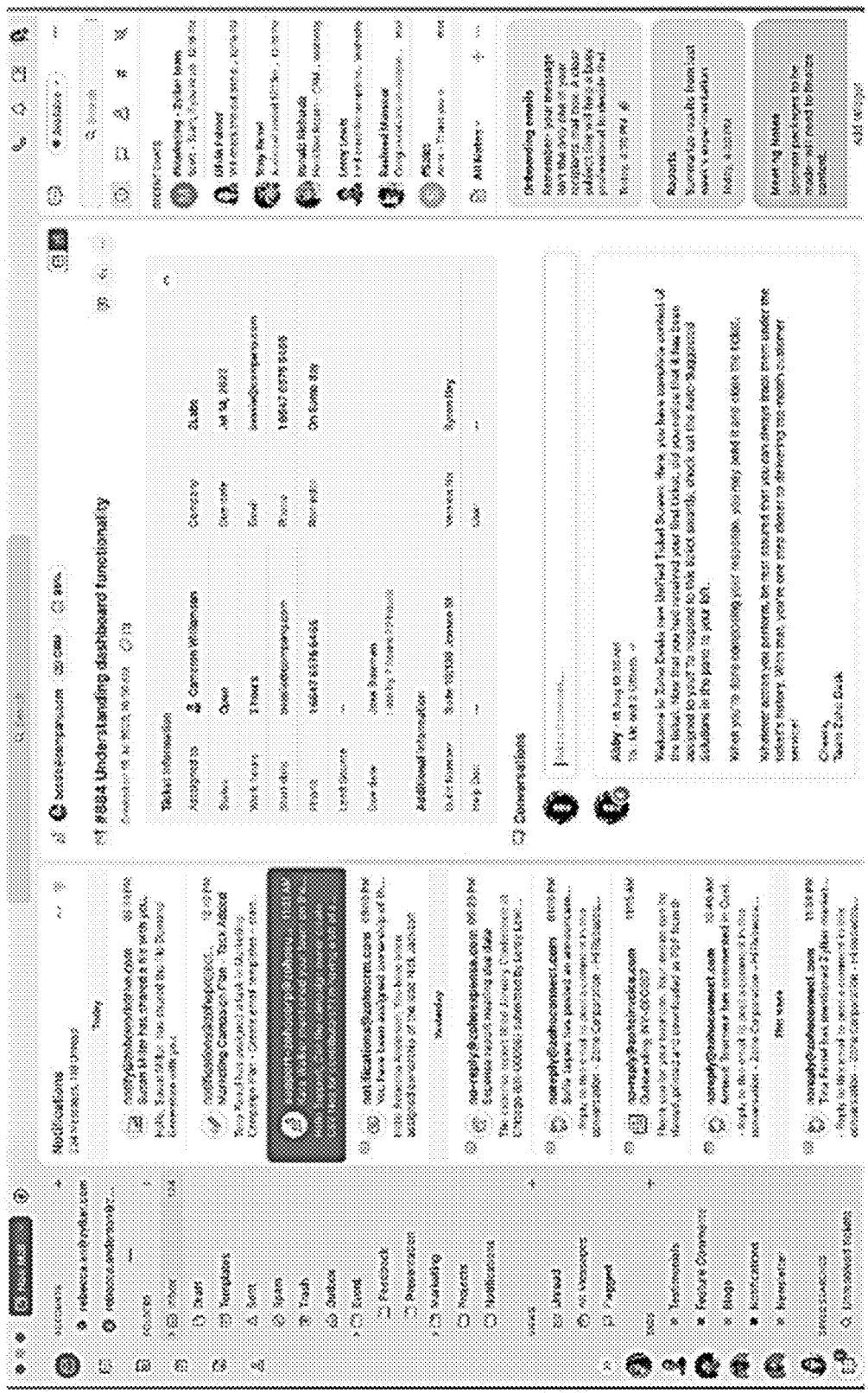
FIG. 4 is a screenshot illustrating a sample user interface in "Smart mail view" of notification email from a help desk software.

The screenshot in FIG. 4 illustrates a sample user interface 400 of smart mail system in as "smart mail view" of a notification email from a service provided by application e.g., ZOHO desk. The user can perform one or more actions on the task like closing the task, marking it as pending, etc., from this "Smart mail view" itself.

Figure 5:
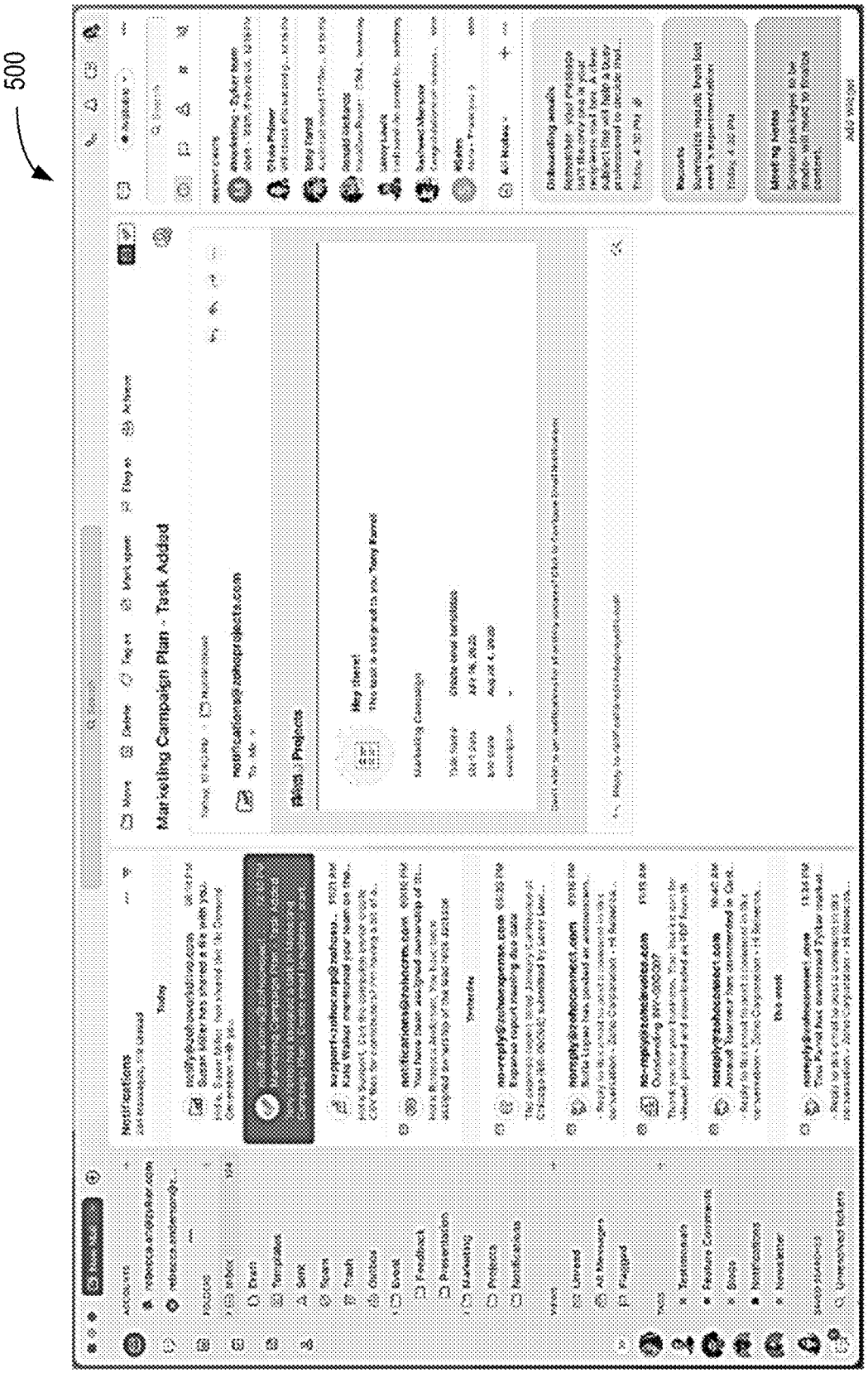
FIG. 5 is a screenshot illustrating a sample user interface in "Email view" of notification email from a project management software.
Figure 6:
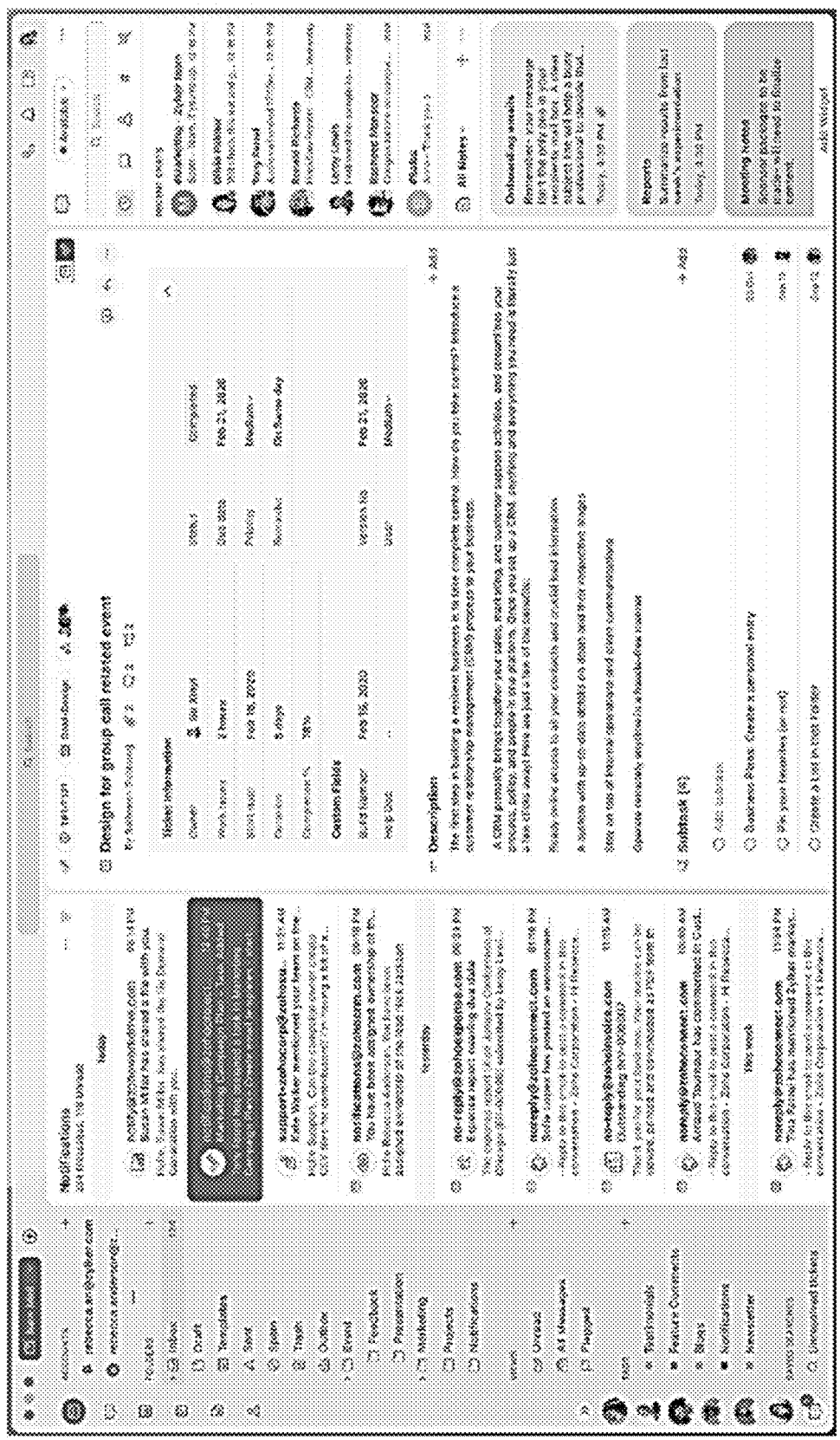
FIG. 6 is a screenshot illustrating a sample user interface in "Smart mail view" of notification email from a project management software.

FIG. 5 illustrates a screenshot 500 of "email view" of a notification email from a service provided by a project management application, e.g., ZOHO projects. FIG. 6 illustrates a screenshot 600 of "live data view" of a notification email from a service provided by a project management application, e.g., ZOHO projects.

Figure 7:
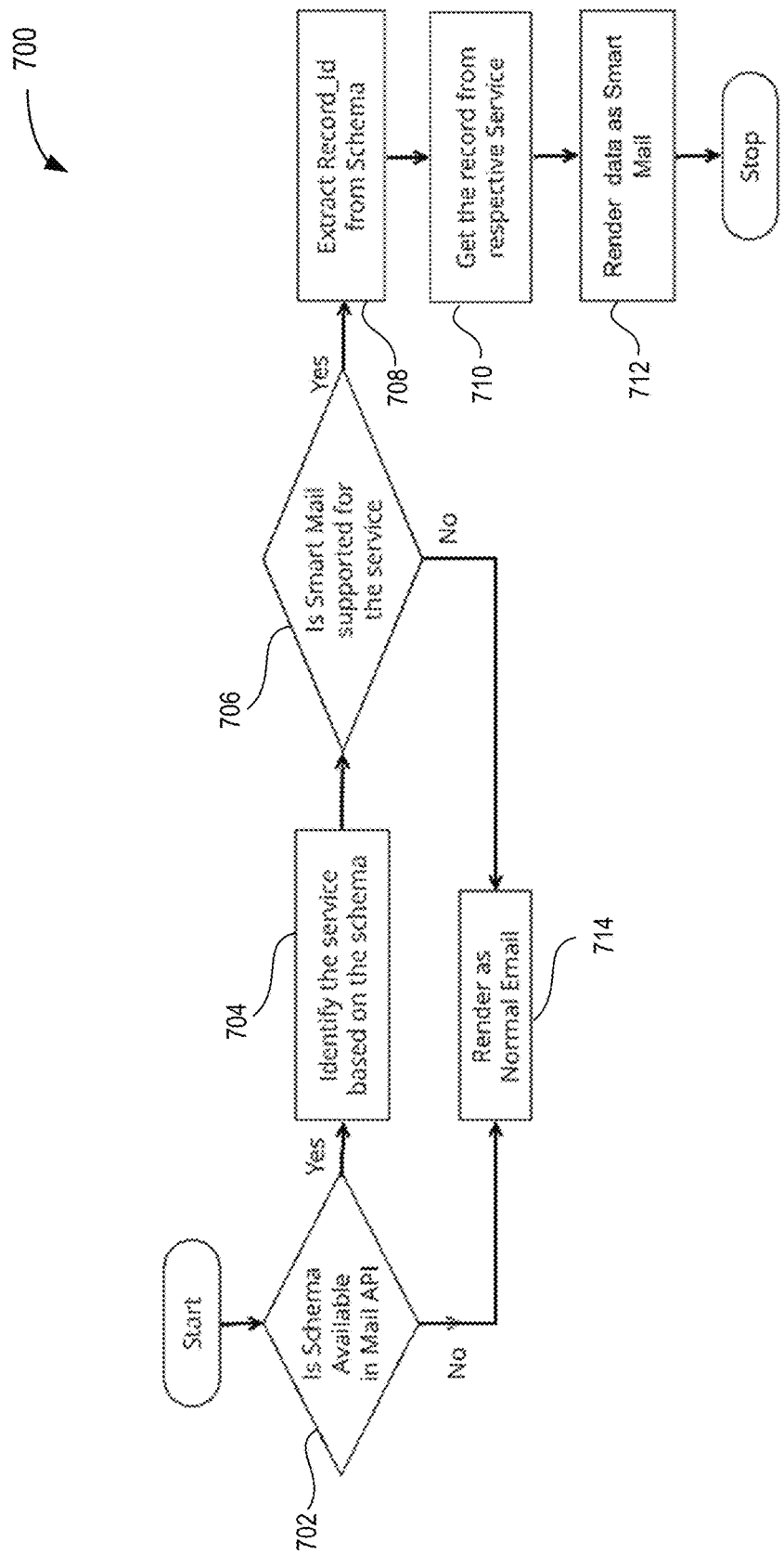
FIG. 7 is a flowchart illustrating an example operation of a smart mail system.

FIG. 7 is a flowchart 700 illustrating operation of a smart mail system. The flowchart begins at decision point 702, it is determined whether a schema is available in Mail API. If it is determined Yes, the smart mail system identifies the service based on the schema at module 704.

At decision point 706, the system determines if a smart mail view is supported for the service. If it is determined Yes, Record_Id is extracted from schema at module 708, the record corresponding to the Record_Id is fetched from respective service at module 710, and data is rendered as smart mail view at module 712. Then the flowchart ends. If, on the other hand, it is determined No at decision point 702 or decision point 706, data is rendered as normal email at decision point 714. Then the flowchart ends.

Figure 8:
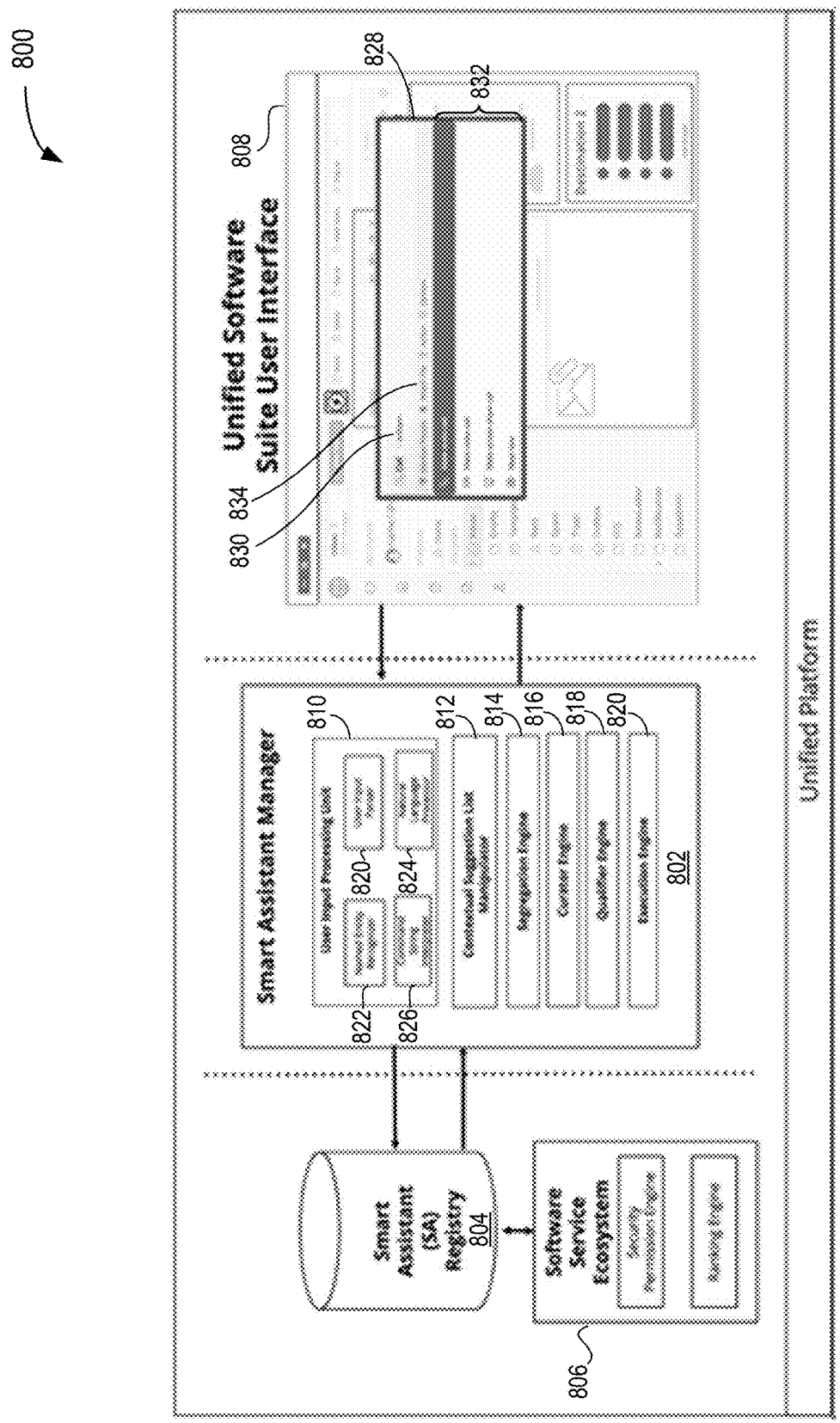
FIG. 8 is a diagram of an example of a smart assistant system architecture.

FIG. 8 is a diagram 800 of an example of a smart assistant system architecture. The diagram includes a smart assistant manager 802, a smart assistant (SA) registry 804 coupled to the smart assistant manager, a software service ecosystem 806 coupled to the smart assistant registry, and a unified software suite user interface 808 coupled to the smart assistant manager. The smart assistant manager includes a user input processing engine 810, a contextual suggestion list manipulator engine 812, a segregation engine 814, a curator engine 816, a qualifier engine 818, and an execution engine 820. The user input processing engine includes a user input parser 822, a Named Entity Recognizer (NER) engine 824, a natural language processor with a natural language processing module 826 and a command string interpreter engine 828. Because the software service ecosystem 806 includes multiple services, the execution engine 820 can be characterized as a multi-service command execution engine.

In a specific implementation, smart assistant is a command line utility that helps users view information or execute one or more actions across various software services based on their data input. A smart assistant view 828 in the unified software suite user interface comprises a user input field 830, an auto-generated action menu 832 for the user to perform the required actions, and a legend 834. The action items in the menu are generated at runtime based on the data input by the user and they correspond to the various actions that can be performed across various services. The smart assistant contextually projects from the input at least one action associated with at least one of the action items from the phrase. Contextually projecting means figuring out from context and the input itself what actions are most likely candidates of interest for the user. The auto-generated action menu includes connected actions, which in alternative embodiments are a set of actions that are related to one another and multiple actions including at least two actions that are predicted to be chosen together for simultaneous execution when the user makes one or more action selections.

In an example of operation, a unified software suite user interface receives one or more command(s) fed by the user. The input is fed to the user input parser, which parses the user input. If the input begins with a Contextually Actionable (CA) command string e.g., "kali", "/meet", "/check-in", etc., then the user input processing engine functions in a "command centric mode". The CA command strings in the input are interpreted by the command interpreter. If the user input includes generic phrases, then the input processing engine functions in "action centric mode". The input is processed by the NER and one or more keywords are extracted from the user input.

The command strings or keywords are interpreted by the command string interpreter. The smart assistant manager checks with a smart assistant service registry if any service could be provided by the software service(s) in the ecosystem, to the interpreted user input.

Based on service support, the suggestion list manipulator generates a contextual suggestion list. The contextual suggestion list includes a set of service-driven commands. The user may select a preferred service-driven command which is executed by the execution engine.

Figure 9:
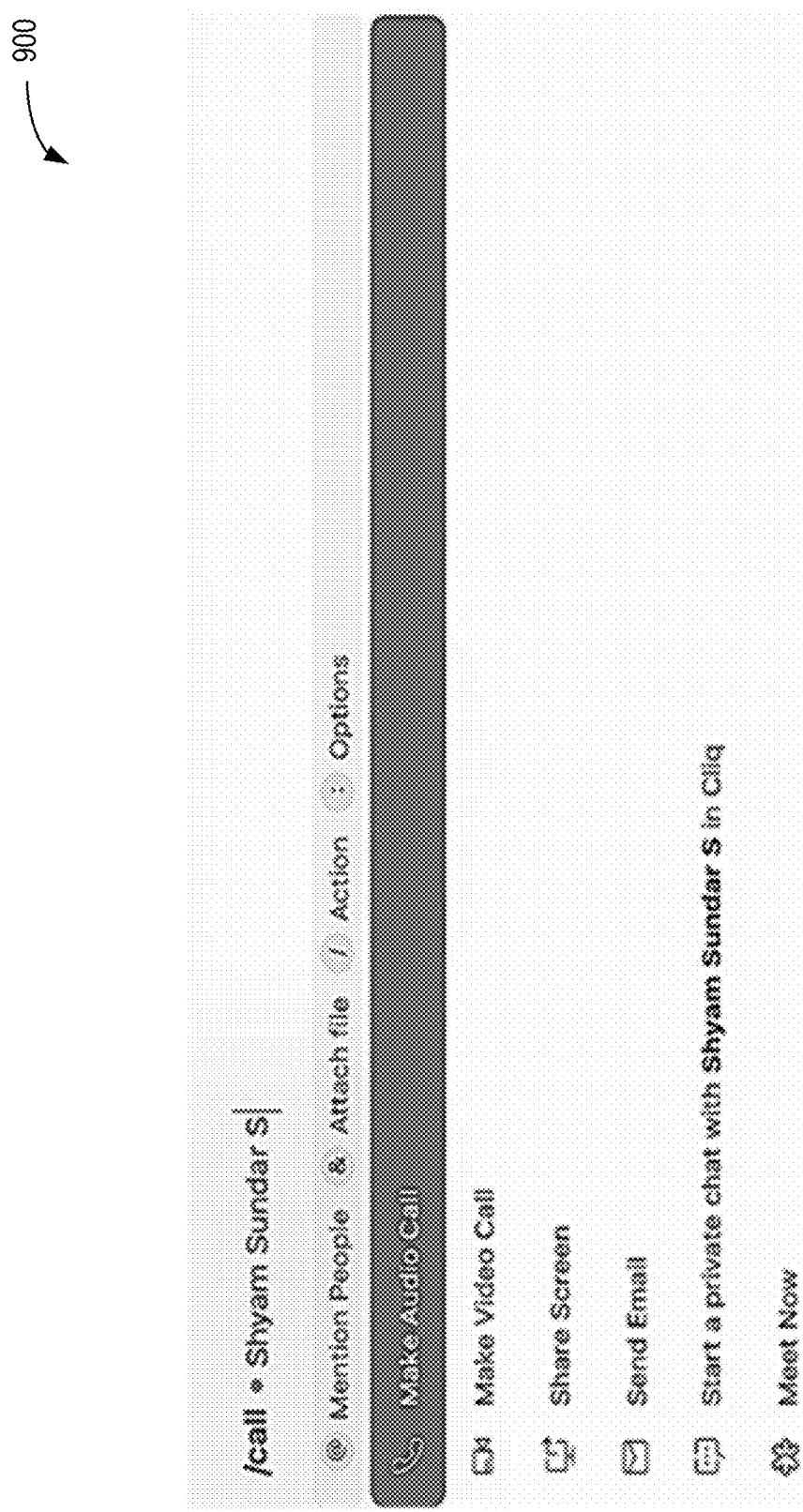
FIG. 9 is a screenshot illustrating functioning of smart assistant when user prefers one-to-one communication.

In an embodiment, the smart assistant system is capable of identifying whether the user has @mentioned a single human agent or multiple human agents, say, if a user has @mentioned a single contact or @mentioned multiple contacts. The smart assistant system is capable of intelligently identifying the @mentioned a single contact or @mentioned multiple contacts from business services, e.g., ZOHO CRM, ZOHO Books, etc. It then suggests a list of service driven commands, which corresponds to the number of contacts @mentioned in the input by the user. A screenshot 900 in FIG. 9, illustrates the functioning of smart assistant when user prefers one-to-one communication between the user and the @mentioned contact. In other words, the user has @mentioned a single contact alone. The list of service driven commands suggested in FIG. 9, corresponds to one-to-one communication.

Figure 10:
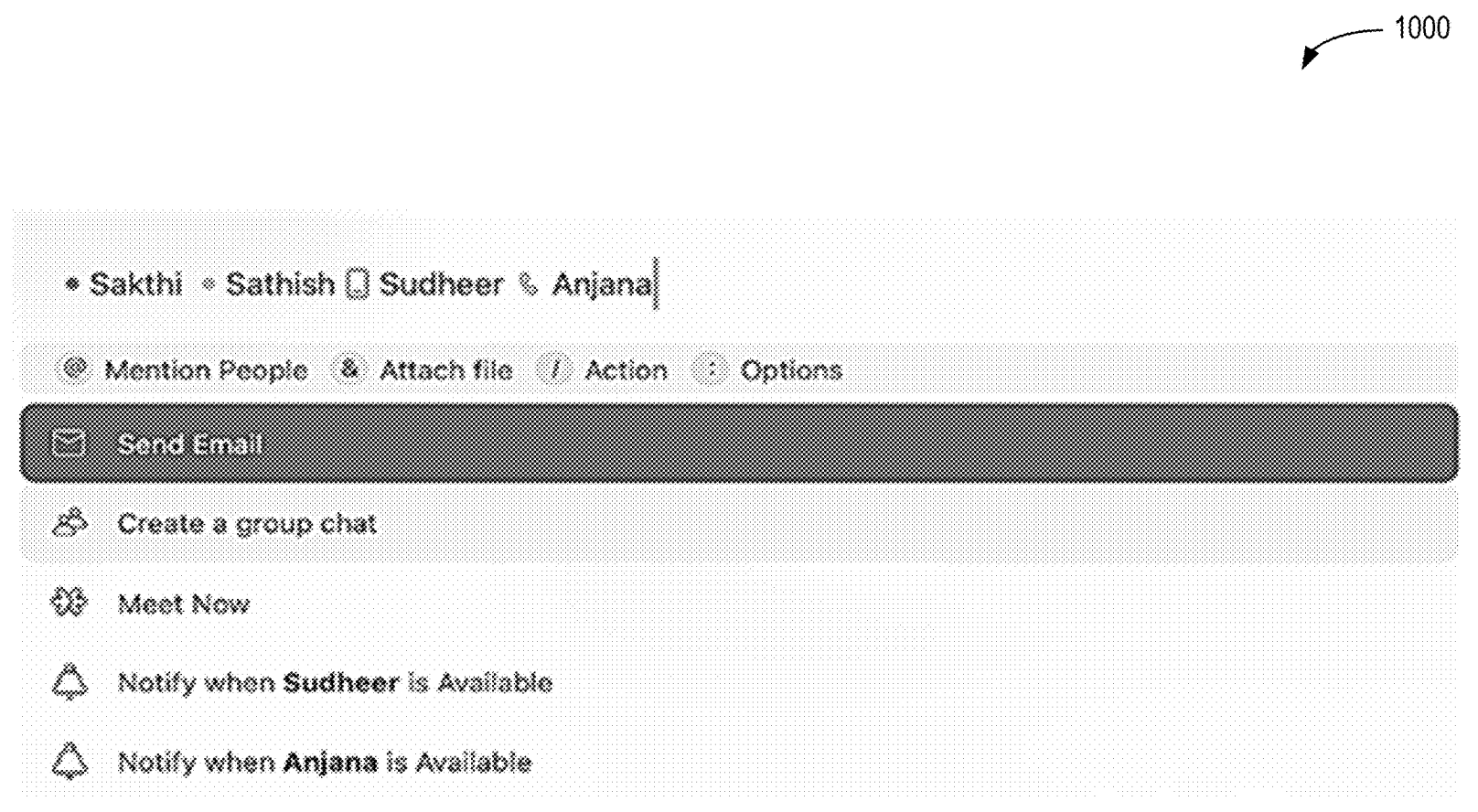

A screenshot 1000 in FIG. 10, illustrates the functioning of smart assistant when user prefers group communication. In other words, the user has @mentioned multiple contacts. The list of actions suggested in FIG. 10, corresponds to the group communication.

In an embodiment, the list also includes a set of actions which correspond to the profile status or availability status of the @mentioned contact or simply contact of a person, present in the input command. The smart assistant manager is capable of intelligently identifying the availability status of the @mentioned contact from the services, e.g., ZOHO People, ZOHO CRM, ZOHO Books, etc. It then suggests a list of actions, which corresponds to the availability status of the @mentioned contact in the input by the user.

For example, if the profile status of the @mentioned contact is "busy", then the list of actions in the drop-down menu also includes an option "Notify when the @mentioned contact is available", as shown in the drop-down menu in FIG. 10. If multiple @mentioned contacts are present in the input command, then the smart assistant manager is capable of intelligently identifying the availability status of each @mentioned contact from a required service. It then suggests a list of actions in a drop-down menu, which corresponds to the availability status of each @mentioned contact in the input. The user input processor of the smart assistant system works in three different modes—command centric mode and action centric mode and bookmark centric mode.

The user input processing unit operates in the command centric mode if the user input begins with a CA command string. The CA command string includes a "/" (forward slash) operator followed by a predefined string e.g. "/Call", "/Check-in", "/Feedback" etc.

In an embodiment, the CA command string may be executable e.g., "/Check-in", "/Check-out". The contextual suggestion list manipulator suggests one or more service driven commands. The user can select a preferred service driven command and get it executed by the execution engine. In another embodiment, the CA command string has to be followed by one or more CA parameters to complete the specified action (e.g., "/Call @agent"). For instance, the user requires to place a call to a contact, say, "@agent" using the smart assistant system. Now the user begins with a CA command string "/call". The contextual suggestion list manipulator suggests one or more services (with reference to the smart assistant registry) which could assist the user in communicating any contact. Here, the "/call" can be established by audio call (provided by a service e.g., ZOHO Cliq), video call (provided by a service e.g. ZOHO Cliq), web meeting (provided by a service e.g. ZOHO Meeting), mail (provided by a service e.g. ZOHO Mail), chat (provided by a service e.g. ZOHO Cliq), etc. Based on the user's selection, one of the suggested services is mapped to the CA command string.

Because the CA command string "/call" requires a CA command parameter, e.g., "@agent", the contextual suggestion list manipulator suggests one or more contacts which is pulled out of the software ecosystem. Based on the user's selection, one of the CA command parameters, e.g., "@agent", is appended to the CA command string. If the CA command string and parameter are executable, then its executed, e.g., an audio call is established between the user and the contact "@agent".

In another embodiment, if there are multiple services which could provide similar types of communication, then the contextual suggestion list manipulator suggests one or more service driven commands. The user can select one of the service driven commands and get it executed. The user has various options to select from the service driven commands, e.g., the user can place a video call instead of audio call. The user can send a meeting invite to get connected with the "@agent".

In a specific implementation, the smart assistant system is capable of handling data access/commands specific to a service by qualifying the command with the service name. For instance, to perform an action specific to a software service, e.g., ZOHO CRM, user can input the command "/CRM <required parameters>" to execute the same.

In a specific implementation, a predefined set of commands for services offered by apps e.g., ZOHO CRM, ZOHO desk, ZOHO projects etc., are mapped to a corresponding action. In an embodiment, a slash command can be mentioned as the service name followed by the corresponding commands. E.g., "/CRM sales-today". Even a particular record's details could be launched by this approach. E.g. "/CRM <contact-name>" could launch the contact details from Customer Relationship Management (CRM) app's database.

To access CRM services, a user can input commands like "/Sales-Today", "/Sales-This-Week", "/Sales-This-Month", or "/Sales-This-Year" through the smart assistant system. The user can also input a command like "/Sales", to view the sales trend. The options for day/week/month/year-wise trend can be selected by the user from the sales trend rendered on the user interface. The user can also access the deals in CRM services, by using the command "/Deals" through smart assistant. The user can also access the activities in CRM by using the command "/My-CRM-Activities", to view upcoming activities list.

To access Helpdesk services, a user can input commands like "/My-Open-Tickets", "/Overdue-Tickets", "/Agent-Status-Change", "/Happiness-ratings-summary", "/Ticket-status-summary", etc.

Figure 11:
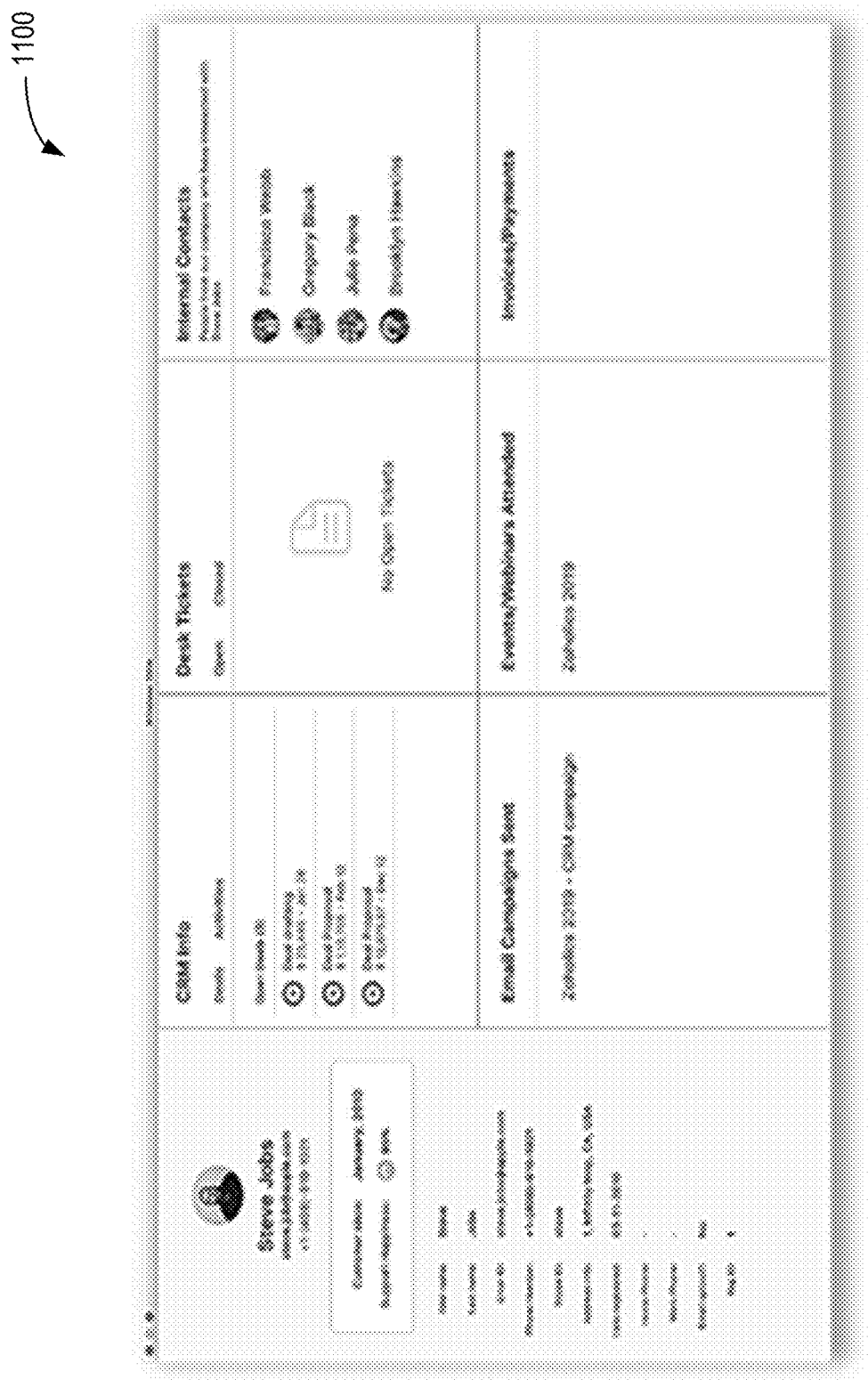
FIG. 11 is a screenshot illustrating a sample user interface for "whois" command of smart assistant.

This can be a distinguished feature of the command centric mode. Assume if a command, e.g., "/Whois steve.jobs@apple.com" is input by a user, it renders all the details about the customer across all the services in the ecosystem. The screenshot 1100 in FIG. 11 illustrates rendered details about the customer steve.jobs@apple.com, from across all the services in the ecosystem.

Possible use cases for "whois" command in service ecosystem, have been listed as below: 1. Customer information from CRM application showing how many deals have been closed or pending, pending activities for him etc. 2. Pending tickets in a help desk application from the customer or company; also, the happiness rating of customers. 3. Email campaigns that have been sent to the customer. 4. Personal events or community events attended by this customer. 5. Webinars attended by this customer. 6. Invoices/Payments pending or renewal date of the customer. 7. People who have been in touch with the customer—In this case all internal org users who have mailed, called, or met the customer (as per records in applications e.g., ZOHO CRM, ZOHO desk and ZOHO sales IQ).

Figure 12:
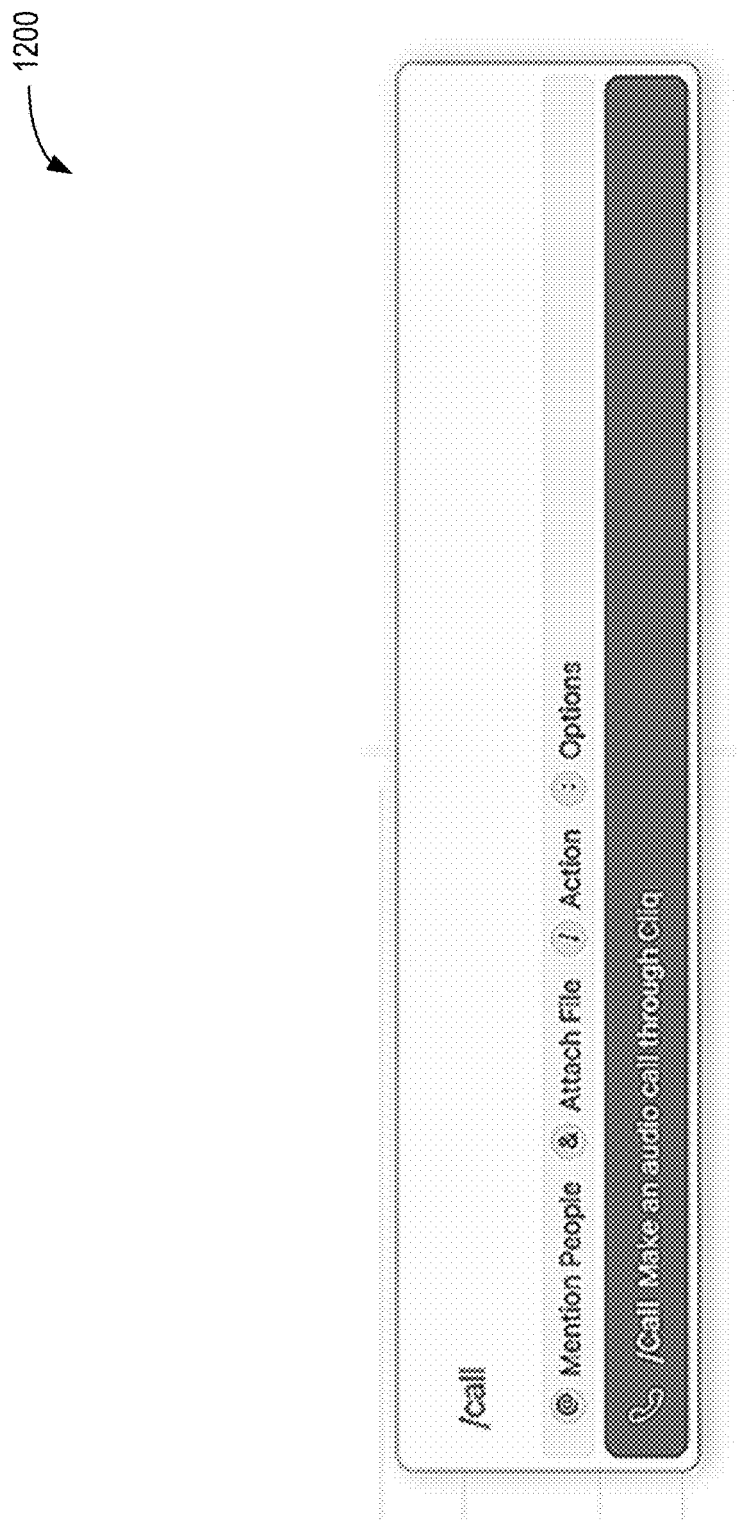
FIG. 12 is a screenshot illustrating the process of using "/call" command and corresponding list of actions in command centric mode of the smart assistant.
Figure 13:
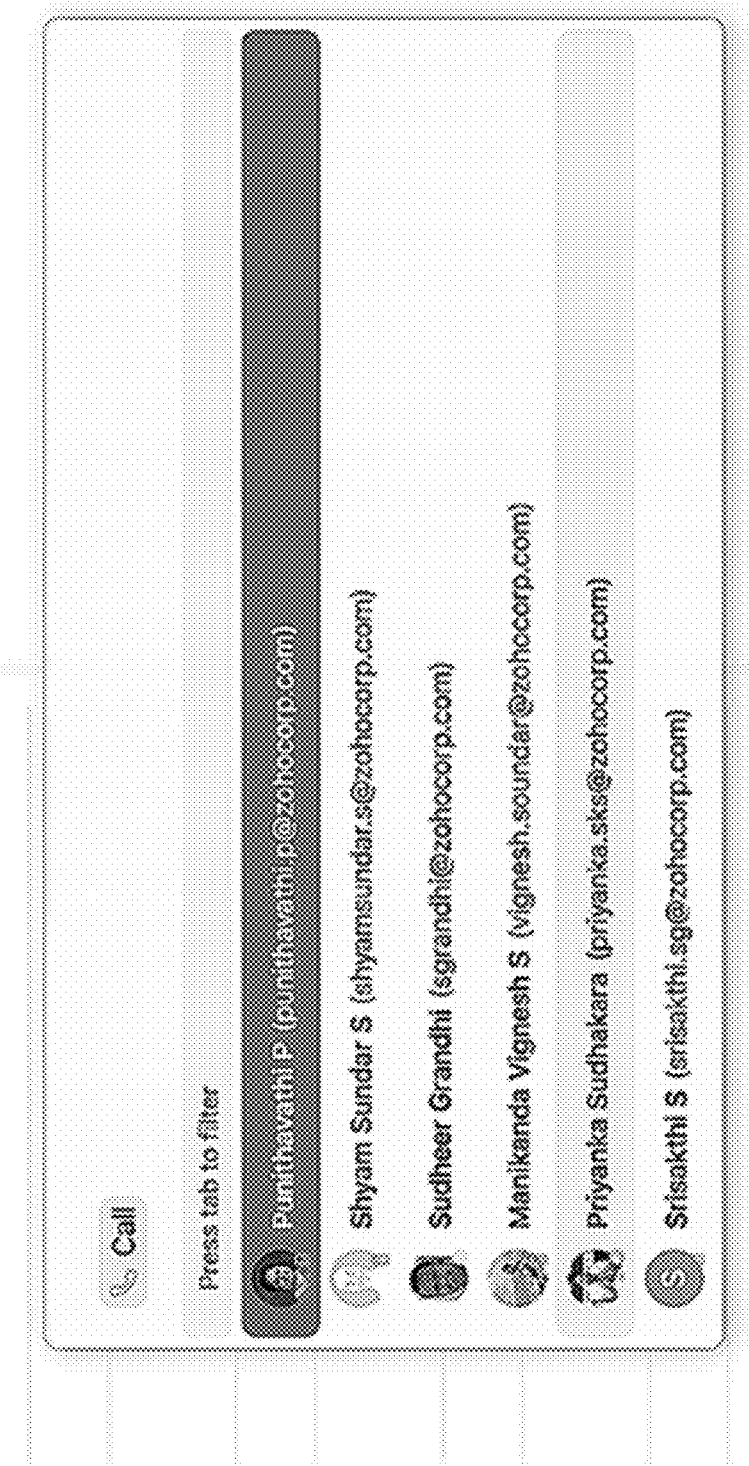
FIG. 13 is a screenshot illustrating the process of selecting one or more contacts to be called using "/call" command, and corresponding list of actions in command centric mode of the smart assistant.
Figure 14:
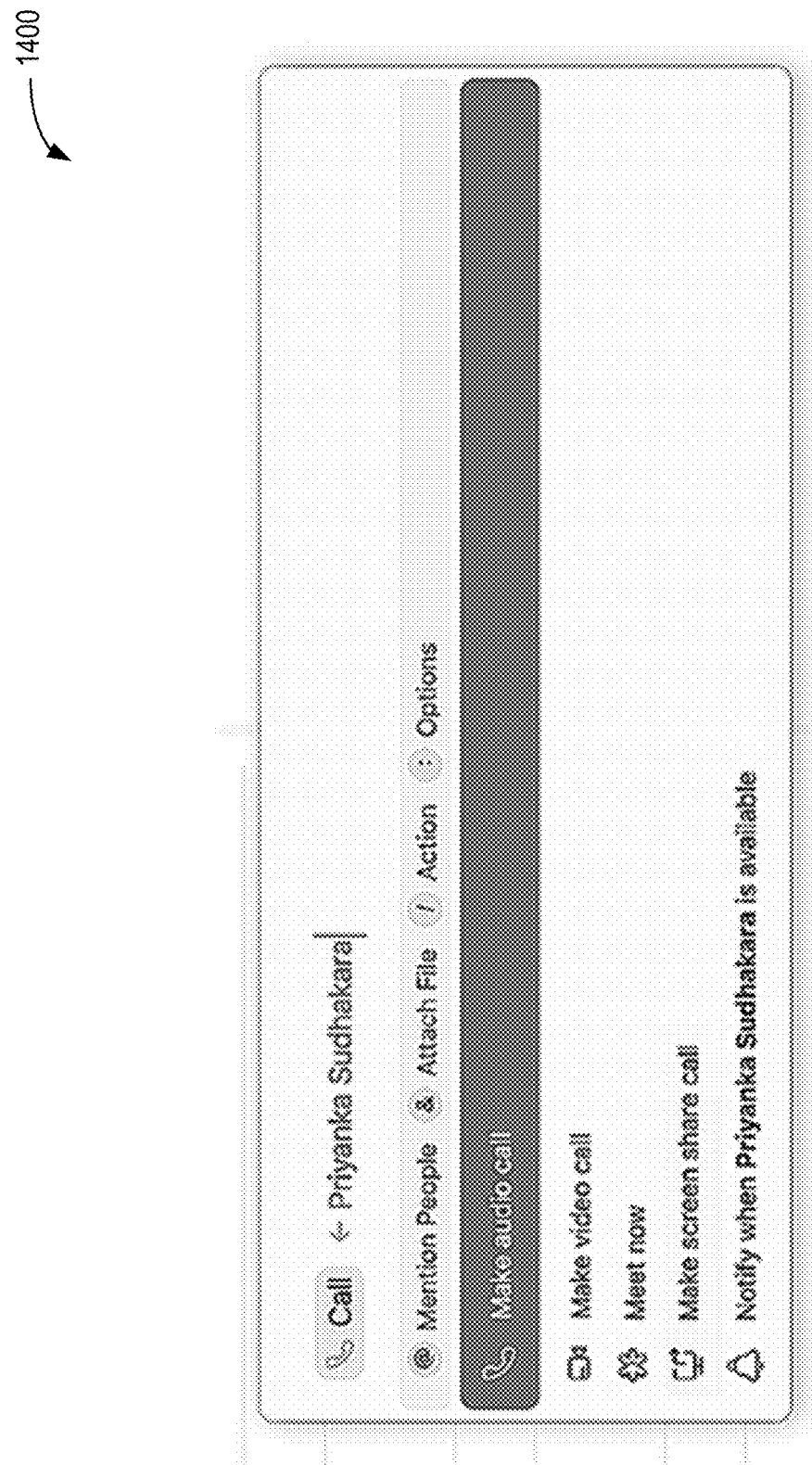
FIG. 14 is a screenshot illustrating the process of selecting a desired action from the list of actions in command centric mode of the smart assistant.

The screenshot 1200 in FIG. 12, 1300 in FIGS. 13, and 1400 in FIG. 14 illustrate a user initiating a call to a human agent by using command "/call". The user inputs the keyword "/call". The smart assistant maps the keyword with the NER. As the keyword is supported by the NER, the smart assistant system suggests an option to place a call using the organization communication app e.g., "ZOHO Cliq" as shown in screenshot 1200 in FIG. 12. The user then selects a human agent by using the "@mention" keyword.

The smart assistant system recognizes the selected human agent and suggests options for audio call, video call, screen share call, use internal meeting app as shown in screenshot 1300 in FIG. 13. Here in the screenshot the selected human agent is not available online, hence smart assistant system suggests an option to send a notification to the human agent once he/she is available online. Based on the selected option call is placed. In an embodiment of the invention, smart assistant system suggests options based on the status of the selected human agent, as shown in screenshot 1400 in FIG. 14.

Figure 15:
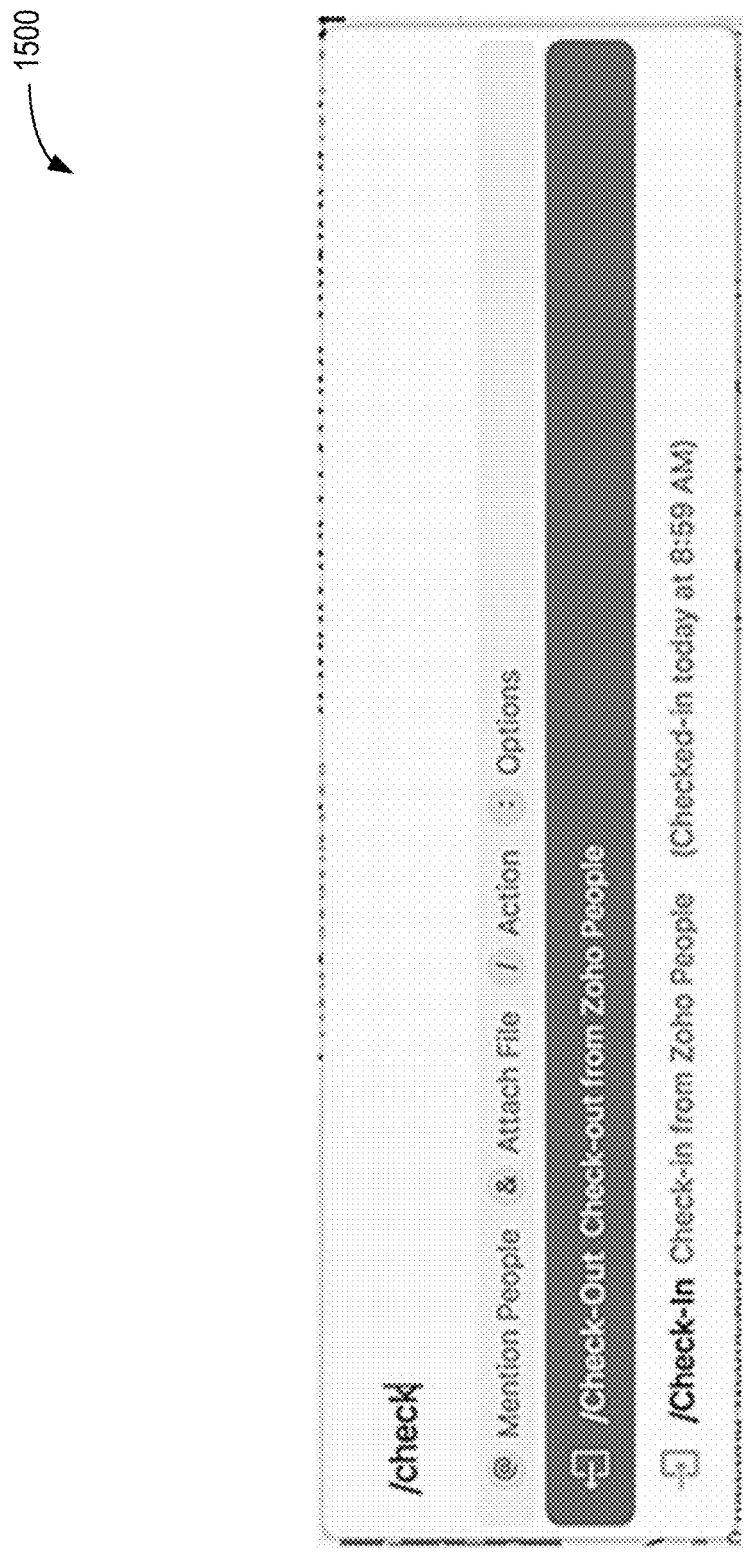
FIG. 15 is a screenshot illustrating "check-out" operation using a smart assistant.

The screenshot 1500 in FIG. 15 illustrates the "check-out" operation using a smart assistant system. The user inputs keyword "/check-out" to sign off. The smart assistant maps the keyword with the NER. As the keyword is supported by the NER, the smart assistant suggests an option to "/check-out from log management app e.g., Zoho People". On selecting the suggested action, the user is checked out from the app. The user can check in back by inputting the keyword "/check-in". The smart assistant automatically suggests an option based on the check-in/check-out status of the user. In this case, the user is already checked in, hence smart assistant automatically suggested "/check-out" option as the user types "/check" keyword.

Figure 16:
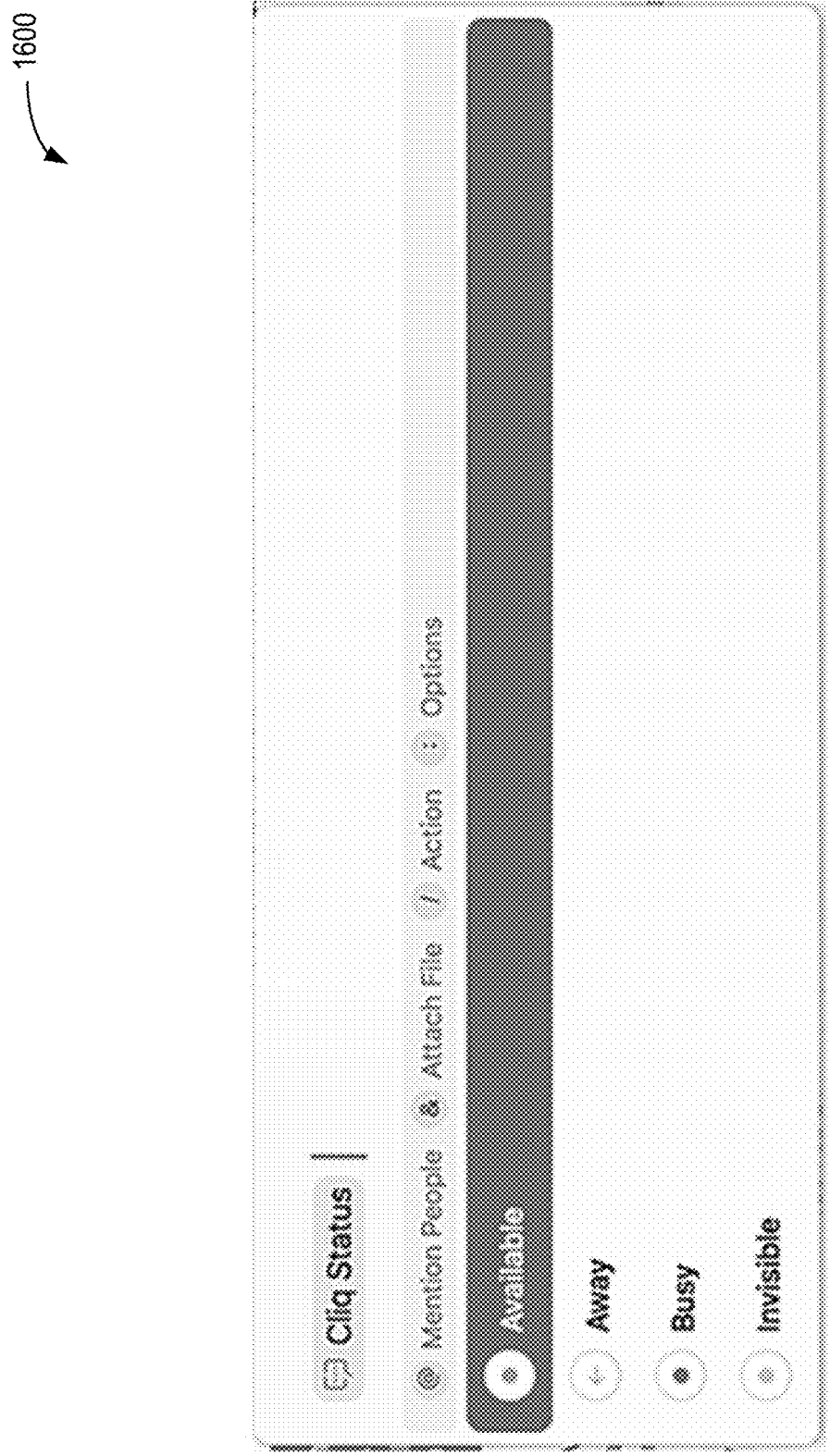
FIG. 16 is a screenshot illustrating modifying a user status using "/cliq status".

The screenshot 1600 in FIG. 16 illustrates modifying a user status using "/cliq status". The user inputs the CA command string "/cliq status". The smart assistant system interprets CA command string and maps it with a corresponding service in the ecosystem. The contextual suggestion list manipulator suggests options to change status of the user such as but not limited to "Available" indicated by a green icon, "Away" indicated by an orange icon, "Busy" indicated by a red icon, "Offline" indicated by a gray icon, "Idle" indicated by a brown icon, "Available on Phone" indicated by a phone icon. On selecting one of the options, the status of the user is updated. The system in command centric mode, identifies the current availability status of the user and suggests a pre-ordered list including other status options. E.g., if user is in invisible status, other status options, e.g., available, busy, away, idle, offline, etc. are suggested for the user to choose from.

Figure 17:
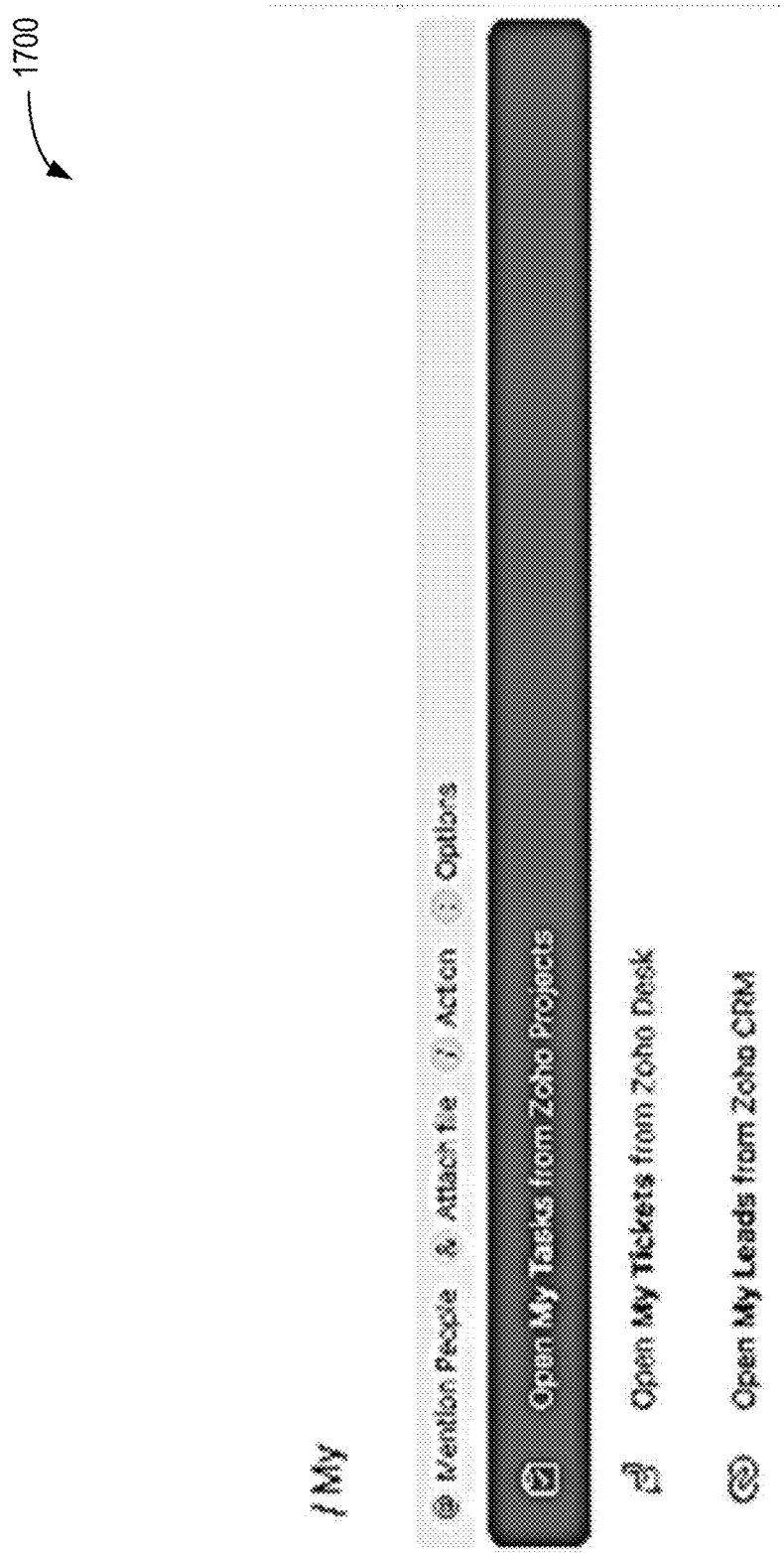
FIG. 17 is a screenshot illustrating operation of smart assistant in Bookmark centric mode.

An entity across services can be marked as favorites for quick and convenient access. Examples of favorite entities are Web links in mail services, pinned contacts in chat application e.g., ZOHO Cliq, favorite custom views in help desk application, e.g., ZOHO Desk, etc. In bookmark centric mode, the smart assistant manager pulls favorite entities across the software ecosystem and makes them accessible as commands invoked using the "/My" operator. FIG. 17 shows a sample screenshot 1700 illustrating bookmark centric mode. For example, if "My Tasks Today" is one of the favorite custom views in Project management app e.g., ZOHO Projects, user can invoke the same using the command "/My Tasks Today" through the smart assistant input field.

Smart assistant system acts in action centric mode when the user prefers to input generic phrases rather than starting it with a dedicated command symbol like "." for calling option, "@" for mentioning a contact, etc., as in command centric mode.

In action centric mode, the user input is mapped to all possible data access and action scenarios across various services and presents these as options for the user to choose from. The user can initiate one or more actions from the presented options, based on need.

The user may optionally use three pre-defined symbols to specify a particular type of data in the input phrase for suitable interpretation and action. The "@" symbol is used to identify or address a user. The ":" symbol is used to specify value for a specific field that is required to execute an action. The "&" symbol is used to include files from various data sources (like the Local file system, files in Workdrive, Attachments received via Mail etc.) for the action. The visual rendering of the data in the input field is also different for different types of data for easy identification and action.

In command centric mode, a user would @mention contact and look for the call, meet, message options, in the contextual suggestion list. In the action centric mode, the user may start with generic phrase or action keyword and then @mention relevant contact. In another embodiment, in the action centric mode, the user doesn't even use @ for mentioning the contact as obviously any phrase following the keywords "Call" or "Meet" will be searched and matched with the contact.

In the action centric mode, the generic phrase, as input by the user, is captured and processed by NER. The NER extracts the keywords from the input. The keywords are mapped to corresponding command string. The command string is interpreted. It is mapped to all possible actions from one or more services. The contextual suggestion list manipulator generates a contextual suggestion list including one or more service driven commands and renders it to the user. Each service driven command can be an action or a data point. In an embodiment, a single input may also require one or actions. One of the service driven commands selected by the user is executed by the execution engine to provide output as desired by the user.

Figure 18:
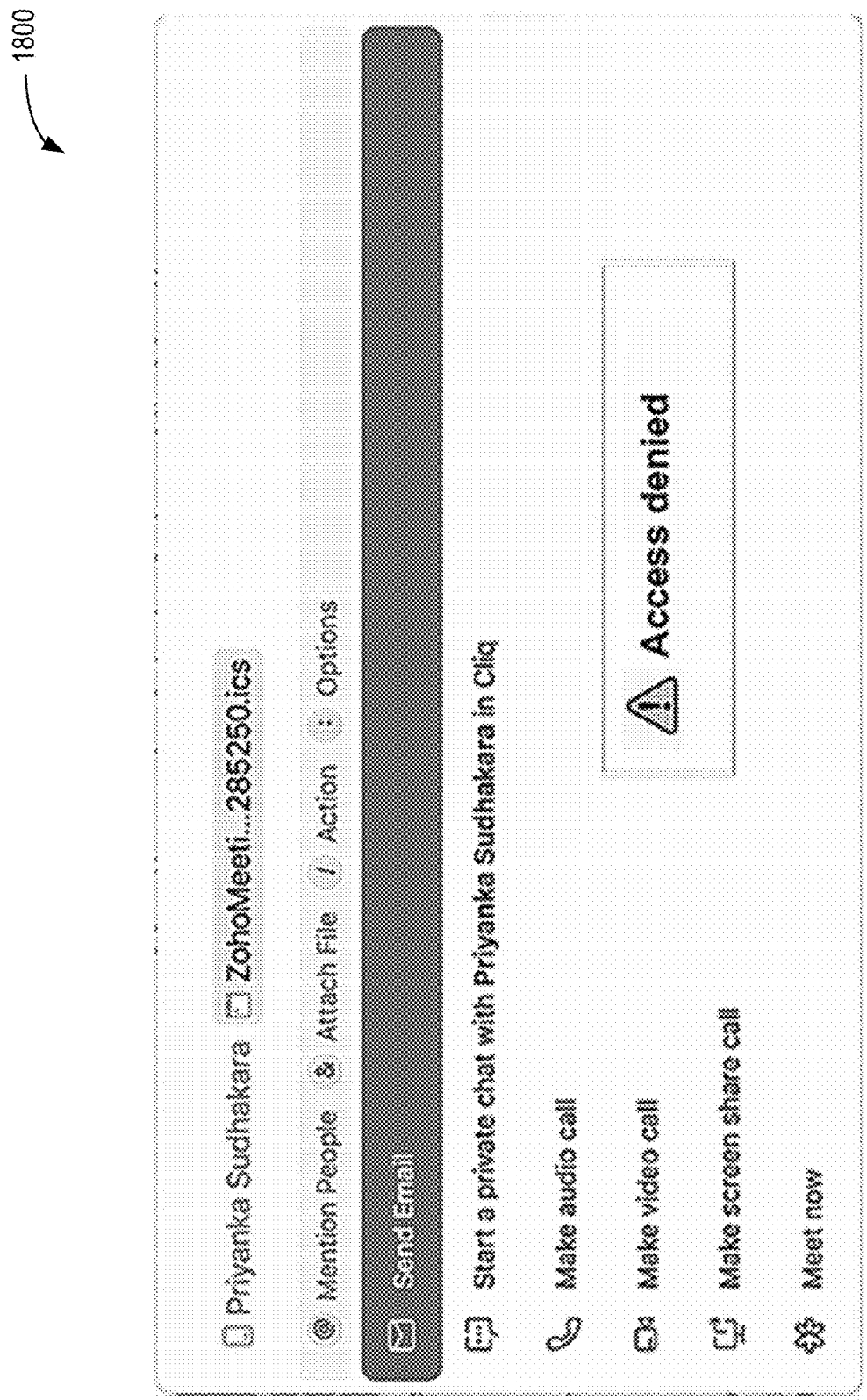
FIG. 18 is a screenshot illustrating the process of @mentioning human agent and sharing a file from workdrive to the @mentioned human agent based on security permissions of the user.

A user can share a file through a smart assistant system, based on security permission of the intended user. Security permissions apply to all data example files, folders, subfolders on a share. As an example, illustrated in the screenshot 1800 in FIG. 18, the user attempts to share a file using a smart assistant system in action centric mode e.g., using generic phrase input. The user starts with the keyword "@mention". The contextual suggestion list manipulator suggests a list of contacts pulled from the software ecosystem. The user can select one or more contacts. In another example, if the contact does not belong to the organization, instead of "@mention", the user can still share the file by mentioning the email id of the agent. The user attaches a file to be shared by using the "&" symbol. To share the attached file "share via workdrive" is selected from the services suggested by the smart assistant engine. Assume if the user doesn't have security permissions to share the file, the smart assistant system disables the user from selecting further action and displays a warning notification "Access denied". It prevents the user from sharing the file. If the user has security permissions to share the file, the contextual suggestion list manipulator suggests various services which offer file sharing.

The smart assistant system in action centric mode can suggest a set of actions. Sometimes the user may be denied from performing the action, based on security permissions. For example, if a person's name is input by the user, then a set of anticipatory options are suggested based on the person's name (data type). If the input is updated further by the user, e.g., assume if the user includes a file name following the person's name, the options/suggestions are updated based on the statement input by the user. But the user may not be able to share the file with the person based on security permissions.

Figure 19:
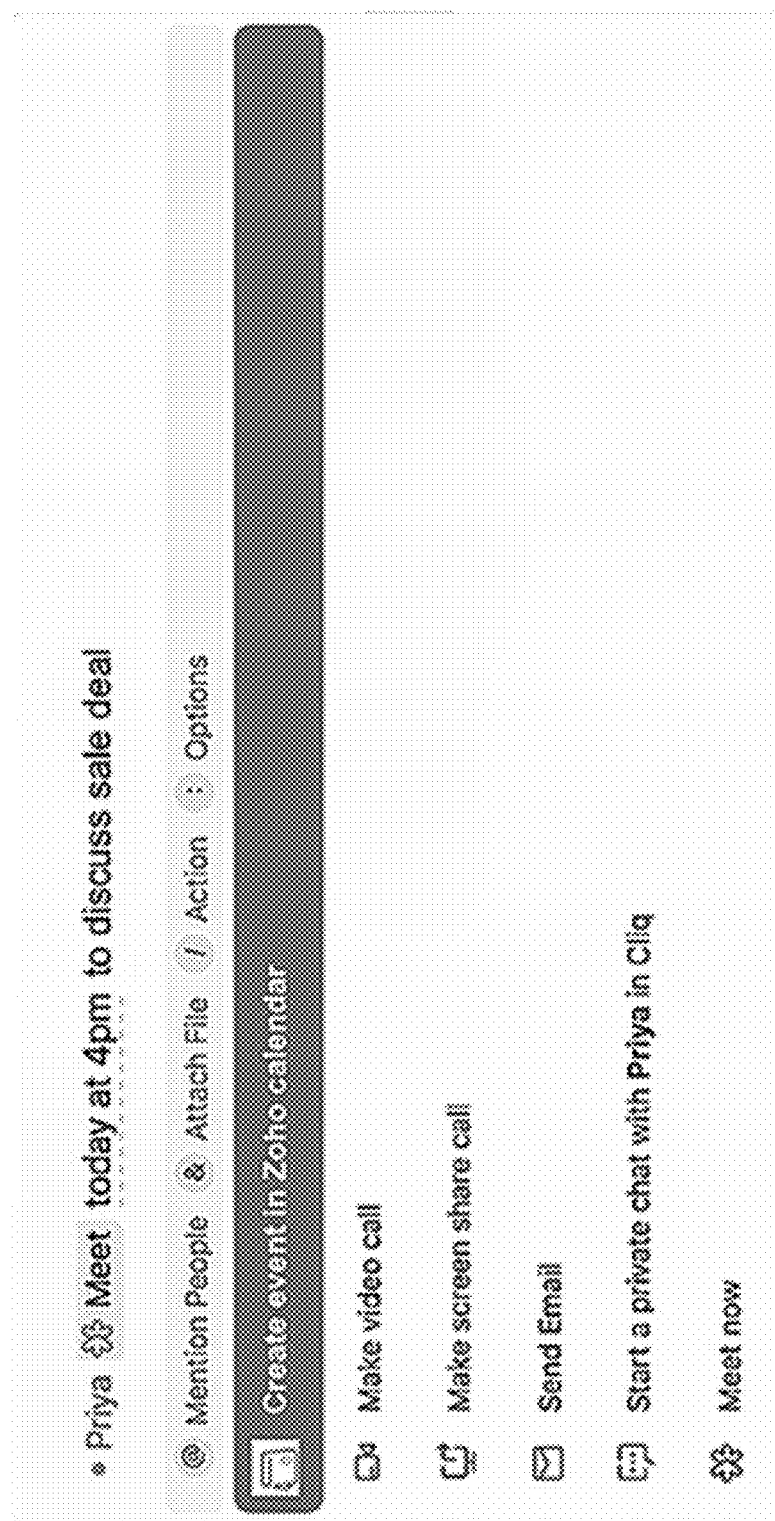
FIG. 19 is a screenshot illustrating the process of creating an event in a calendar application using smart assistant in action center mode.

A second example illustrating the operation of the smart assistant system in action centric mode, to create an event in calendar application, is illustrated by screenshot 1900 in FIG. 19. The user inputs a generic phrase, assume "@Priya Meet at 4 pm to discuss sales deal". The NER in user input processing unit of the smart assistant manager, extracts the keywords from the input phrase and interprets it. The contextual suggestion list manipulator suggests one or more service driven commands from which user can select a desired command. The selected service driven command is executed by the execution engine to create a calendar event.

The smart assistant system recognizes whether the contact @mentioned in the input phrase belongs to the organization. The system checks whether the "@?mentioned" human agent is available at the said time from the calendar of the human agent. If the human agent is not available or already has an event scheduled at the said time, the system notifies the user that the human agent is unavailable at the said time for a meeting. If the human agent is available at the said time, the system suggests scheduling an event in a calendar app e.g., Zoho calendar. Based on the user selection, the suggested option, an event is scheduled, and a participant invite is sent to the human agent.

Figure 20:
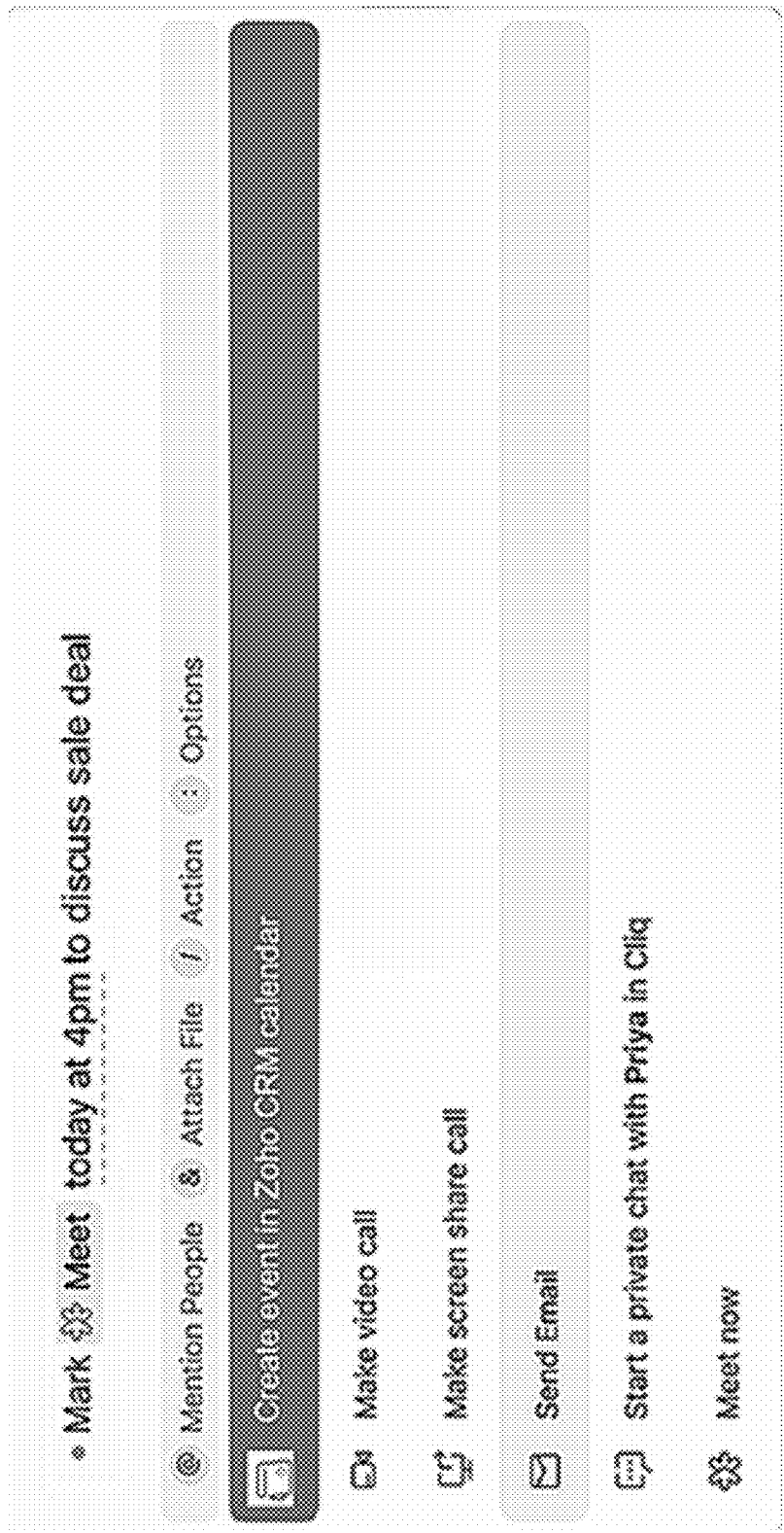
FIG. 20 is a screenshot illustrating the process of creating an event in a calendar integrated with Customer Relationship Management (CRM) application using smart assistant system in action centric mode.

If the smart assistant system identifies that the "@mentioned" human agent is a non-organization agent but a contact in organization CRM, then contact is received as an email id from the user. The system will suggest one or more service driven commands. Assume if the user selects a service driven command, e.g., to create the event in a CRM calendar app e.g., Zoho CRM calendar, as depicted in the screenshot 2000 in FIG. 20. The selected service driven command is executed by the execution engine. An event is scheduled, and a participant invite is sent to the human agent.

Figure 21:
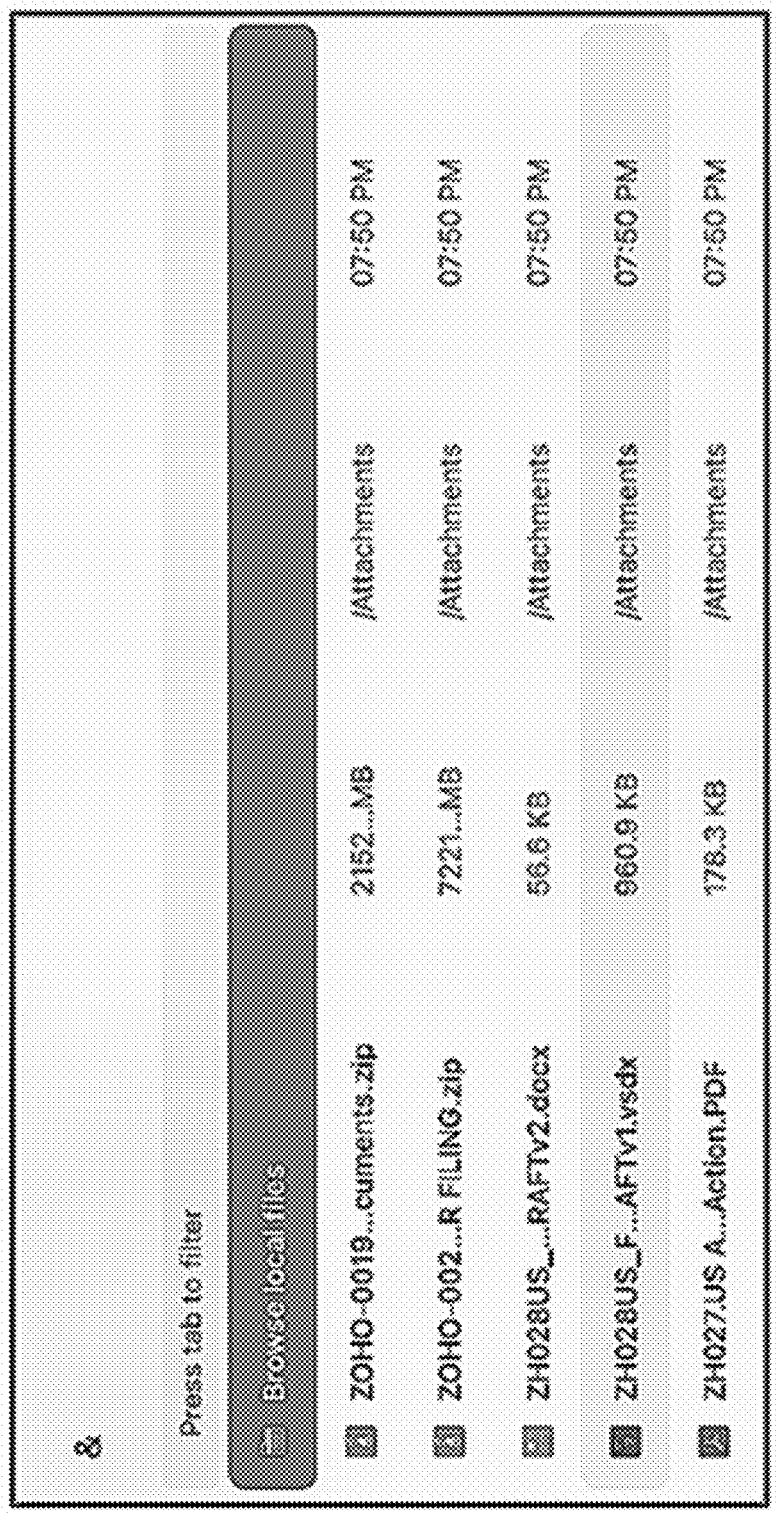
FIG. 21 is a screenshot illustrating the operation of the smart assistant system in action centric mode to share a file.
Figure 22:
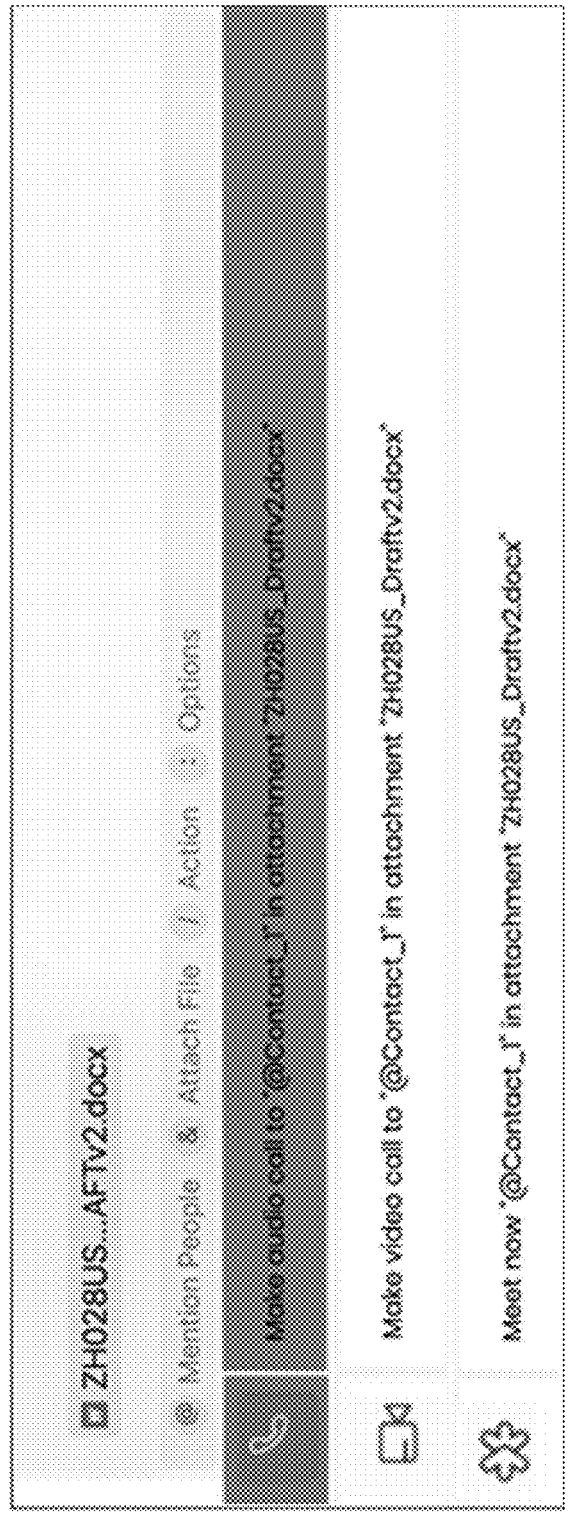
FIG. 22 is a screenshot illustrating the list of suggested actions by smart assistant system in action centric mode to share a selected file.

The third example illustrating the operation of the smart assistant system in action centric mode is illustrated with screenshot 2100 in FIG. 21 and screenshot 2200 in FIG. 22. Assume if the user with an intention to share a file starts typing "&"; the contextual suggestion list manipulator suggests all recent files, folders, etc. to allow the user to select a file to be shared; as shown in FIG. 21. Say, the user has selected a file which comprises one or more organizational contact details. Now if the user has not mentioned any contacts with whom the file has to be shared, the segregation engine determines whether to consume entire or partial file and identifies potential contacts from the file. The segregated contact is then curated by the curator engine. The curator engine cleanses and transforms the segregated contact. The curated contact is qualified by a qualifier engine. The smart assistant manager checks with the smart assistant registry for the service which could provide required solution. The contextual suggestion list manipulator suggests one or more service driven commands representing the file sharing with the contact(s) present in the file, as shown in FIG. 22. The user may select the required service driven command which is executed by the execution engine.

Figure 23:
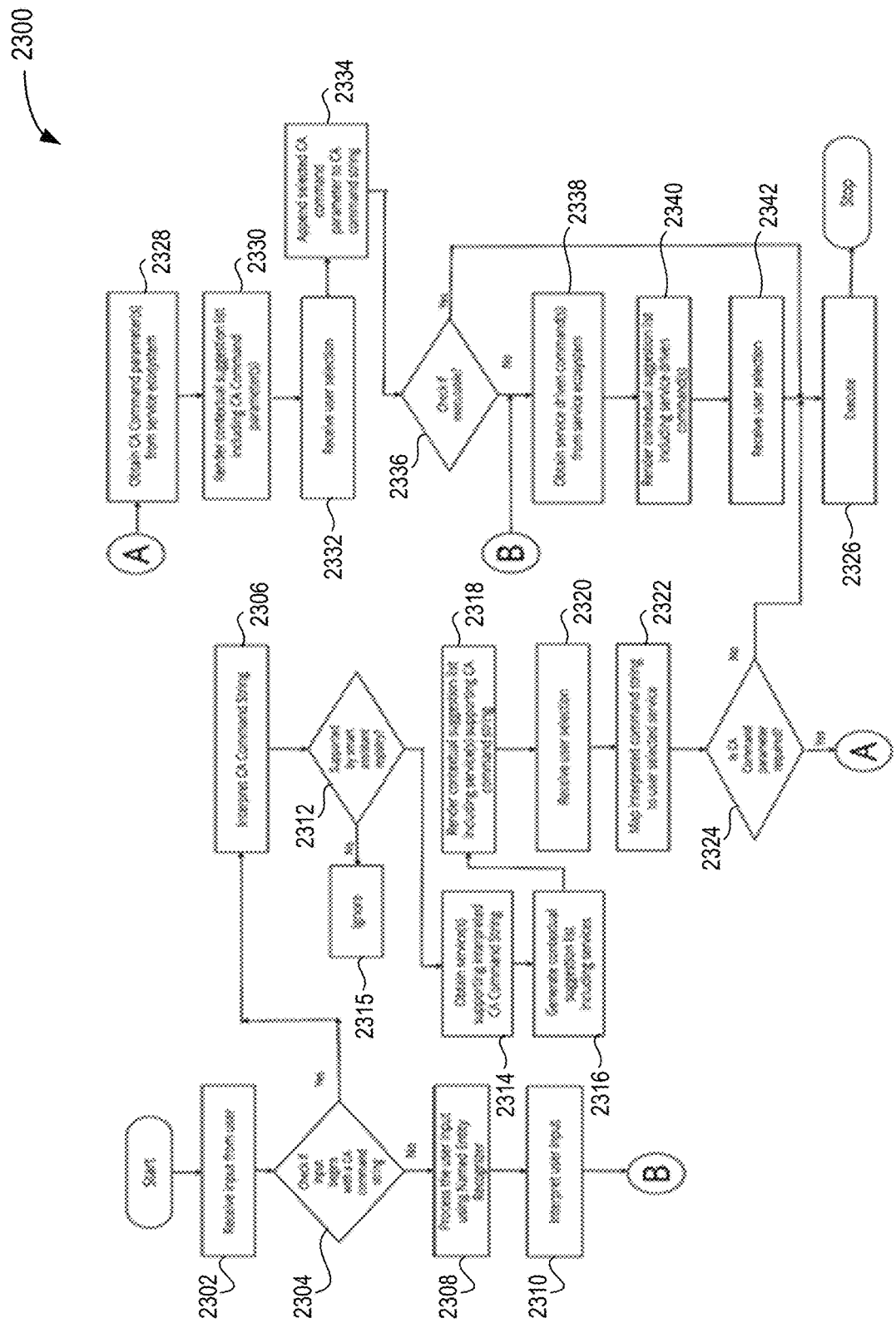
FIG. 23 is a flowchart of an example of operation of a smart assistant system.

FIG. 23 is a flowchart 2300 of an example of operation of a smart assistant system. The smart assistant engine renders one or more CA command strings and its corresponding functions for user's convenience. The smart assistant engine receives an input string from the user at module 2302. The input could be a generic phrase, or it could include a CA command string. If it is determined at decision point 2304 that the input begins with a CA command string, then the command string is interpreted directly through command centric mode at module 2306. If the input string includes a generic phrase, then the input is processed through action centric mode; the received input is processed using NER at module 2308. The NER recognizes the keywords from a generic phrase input by the user and the keywords are interpreted at module 2310 and continues from module 2338 as described below.

In command centric mode, the system checks with the smart assistant registry if any services are registered to act upon the interpreted command string following module

2306. If it is determined services are registered to act upon the interpreted command string at decision point 2312, then service(s) supporting interpreted CA command string are obtained at module 2314 and a contextual suggestion list manipulator generates a contextual suggestion list including the service details at module 2316. The contextual suggestion list, including service(s) supporting CA command string, is rendered to the user at module 2318. The smart assistant system receives a service selected by the user from the contextual suggestion list at module 2320 and maps the interpreted command string to the service at module 2322.

The smart assistant system checks if the CA command string requires a CA command parameter at decision point 2324. If no CA command parameter is required, this means that the CA command string is executable, and it is executed by the execution engine at module 2326. If yes, then the contextual suggestion list manipulator refreshes the contextual suggestion list with a list of CA command parameters pulled from the software ecosystem at module 2328. The refreshed contextual suggestion list, including CA command parameter(s), is rendered to user at module 2330. The user is allowed to select one or more CA command parameters, which are received at module 2332. The user selected CA command parameters are appended to the CA command string at module 2334.

At decision point 2336, it is determined whether CA command parameters are appended to the CA command string and is executable by the execution engine. If yes, then the execution engine executes the command and generates the required output at module 2326. If no, then contextual suggestion list manipulator refreshes the contextual suggestion list with a list of service driven command representing the action performed on the CA command parameters by the services in the ecosystem, obtaining service driven command(s) from service ecosystem at module 2338. The refreshed contextual suggestion list, including service driven command(s) is rendered to the user at module 2340. The user can select a desired service driven command, which is received at module 2342. The execution engine executes the service driven command and generates the required output at module 2326.

In action centric mode, the smart assistant system receives a generic phrase as input which is processed by NER. The NER extracts keywords from the input phrase. The keywords may include action points, data points, etc. The contextual suggestion list manipulator generates a contextual suggestion list including a list of executable service driven commands equivalent to the input phrase. The contextual suggestion list is rendered to the user. The smart assistant system receives a service driven command selected by the user from the contextual suggestion list. The selected service driven command is executed by the execution engine.

In a specific implementation, a smart flow system enables movement of a Contextually Actionable (CA) entity (of different types like user thumbnail/photo, email ID, files, contacts or list of contacts, text, hyperlinks, date/time, location, etc.) rendered in various parts of the UI in the application from one service to another using, for example, a drag and drop mechanism. The mechanism takes care of mapping actions across services intuitively based on the entity that is being dragged and the drop target in the User Interface.

Smart flow system is a service-agnostic feature in which source and destination services can decide an action on a CA entity independently, irrespective of the service. The CA entity from a source User Interface (UI) can be placed (through a drag and drop action) on a CA executing target. A CA entity outside the user interface of the unified software suite can be placed (through a drag and drop action) on the CA executing target of the user interface of the unified software suite. For example, a CA entity ".csv file" from a local file folder can be dropped on a CA executing target of the unified software suite.

The smart flow system helps users move CA entity fluidly across various CA executing targets through the UI. The CA entity can be broadly classified into the following types: files, contacts, groups, text, hyperlinks, date/time, geolocation. The CA entity file type can include a file rendered as a document in full (like images) or represented by its meta information (like file name, file type, size etc.) or as a hotlink pointing to the original source. This includes files from various sources and with all extensions (like .txt, .pdf etc.) The CA entity contact type can include a visual element that identifies users/people e.g., thumbnail photo of a user, email id of the user etc.) The list of contact type includes a collection of people/users identified by a name, list of usernames, list of email ids or a group photo (e.g., a group/channel in a chat application, all attendees of a calendar event etc.). The text type includes a user selected section of textual content on screen a text message in a chat application, a selection of textual content received via email etc.). The date/time type includes any date/time visual representation on screen either in a specified date/numeric format or in a special text format (like Today, Tomorrow, This Month etc.). The geolocation type includes any word/set of words identifying a geo-location on the world map.

In a specific implementation, a smart flow system helps fluid movement of any/all of seven different CA entity file types (Files, Contacts or Group of Contacts, Groups, Text, Hyperlinks, Date/Time, Location) from the source UI to a CA executing target through, for example, the help of drag and drop mechanism facilitated by mouse/trackpad in the user machine. The source UI and CA executing target could be rendering CA entity file type/controls from the same or different services. An example source UI and CA executing target includes email detail view, service widget view, button elements in a tool bar, etc. Source UI and CA executing target may be interchangeable.

A Contextually Actionable (CA) engine enables user to upload files just by dragging and dropping an email attachment onto a desired widget that supports file upload. Through CA engine, sharing a document (CA entity) means, for example, simply dragging and dropping a person's thumbnail or profile photo onto a folder in a desired widget (CA executing target), e.g., storage service providing app like Workdrive.

Figure 24:
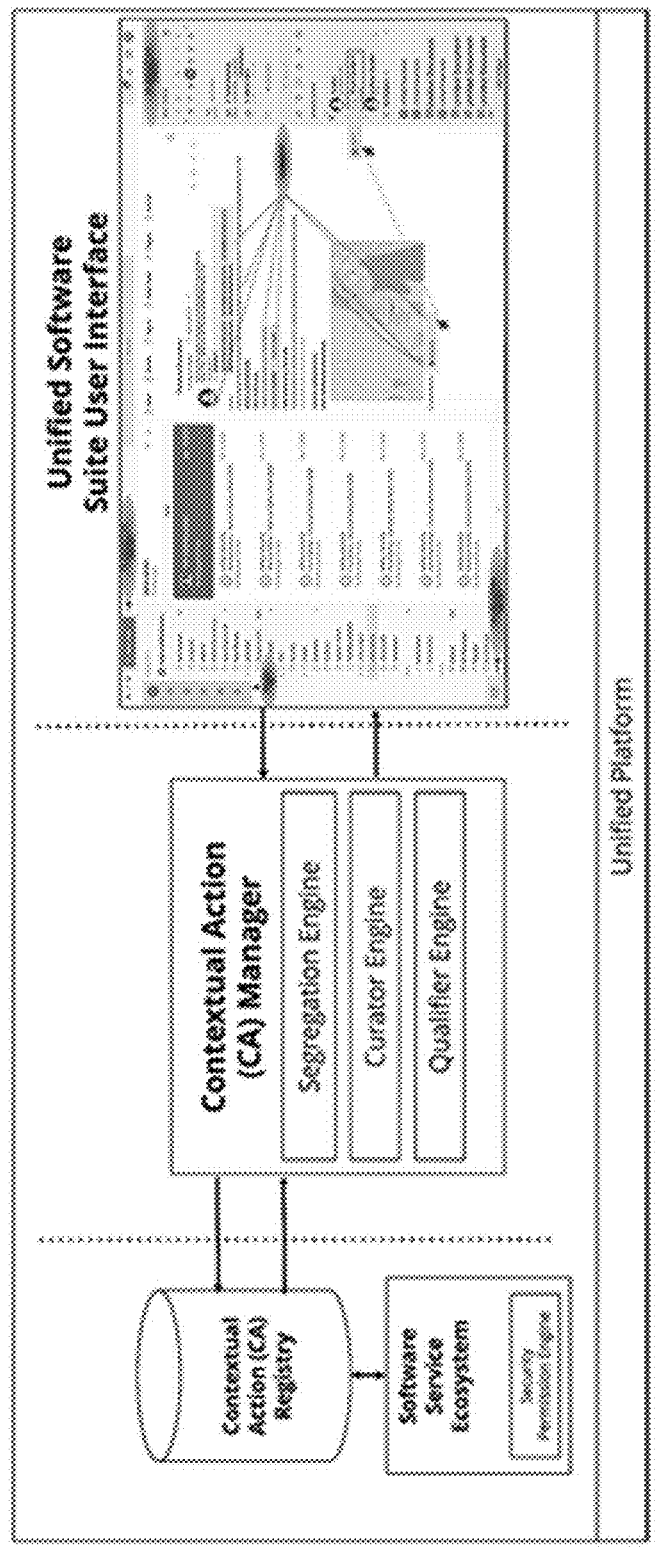
FIG. 24 is a diagram of an example of an architecture of a smart flow system.

FIG. 24 is a diagram 2400 of an example of an architecture of a smart flow system. The diagram includes a source UI 2402, a CA entity 2404, a CA executing target 2406, and a Contextually Actionable (CA) manager 2408, all of which are coupled to a unified software suite user interface; and a Contextually Actionable (CA) registry datastore 2410 and a software service ecosystem 2412. The source UI includes one or more views/UI elements with corresponding CA entity file types. The CA executing target includes one or more views or action elements. The CA manager includes a segregation engine 2414, a curator engine 2416, and a qualifier engine 2418. When a CA entity is dragged from a source UI and dropped onto a CA executing target, the segregation engine determines whether entire or partial CA entity is to be moved to the CA executing target. The segregated CA entity is then curated by the curator engine.

The curator engine checks the condition of the segregated CA entity. The curated CA entity is qualified by the qualifier engine.

The qualifier engine checks for associated context about the curated CA entity. The associated context is added to the curated CA entity. The CA entity associated with the selected CA entity is segregated, curated and qualified and is checked with the CA registry. The CA registry datastore will hold information related to a list of services and possible actions for the CA entity. The information is forwarded to the CA registry by the software service ecosystem. The software service ecosystem forwards the services corresponding to a CA entity. The software service ecosystem includes a security permission engine; it forwards the security permissions or access permissions of the selected CA entity corresponding to an intended user. The overall architecture provides fluidity to CA entity movement. A user can drag a CA entity from source UI and drop it at a CA executing target.

Figure 25:
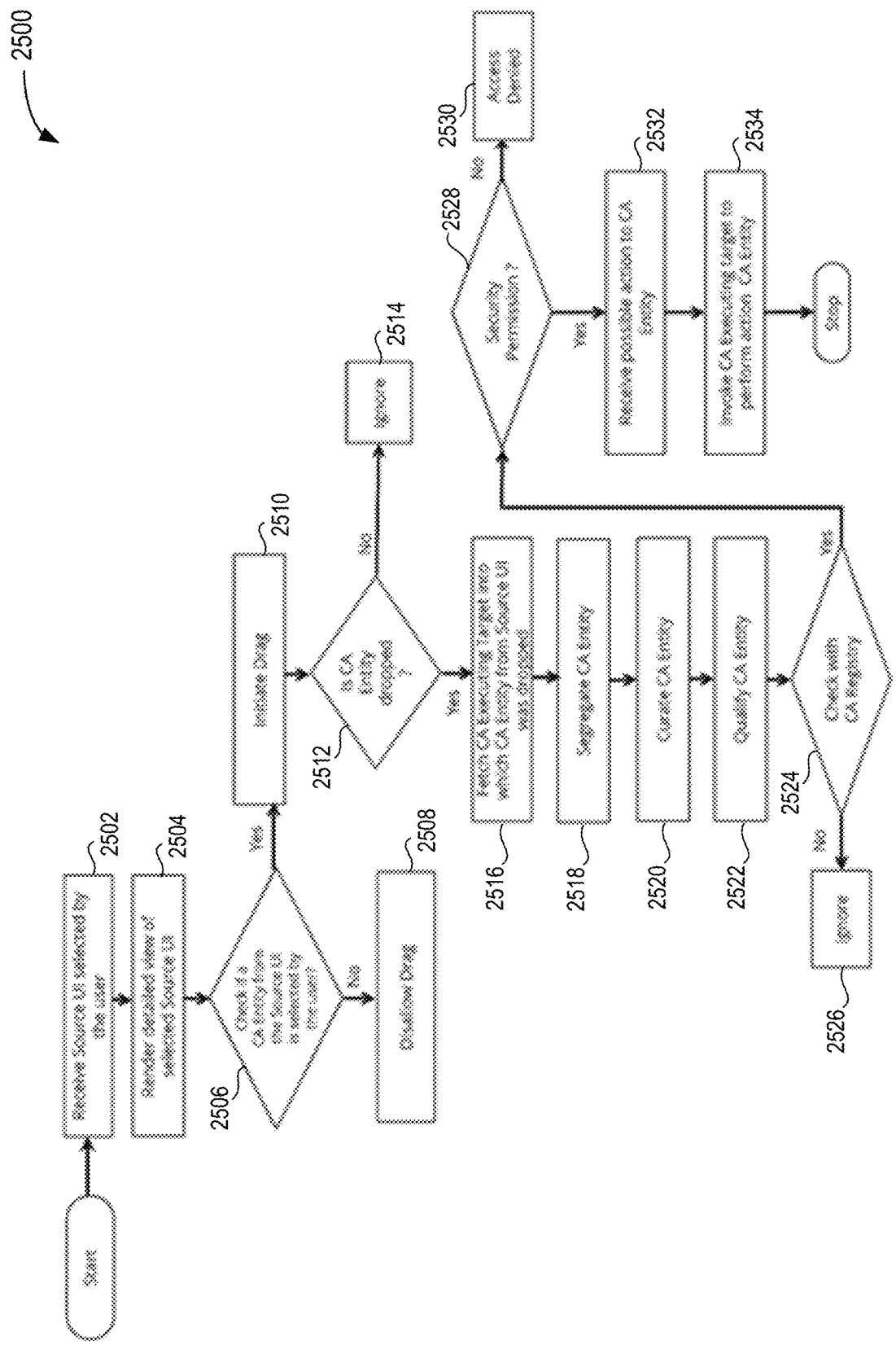
FIG. 25 is a flowchart of an example of operation of a smart flow system.

FIG. 25 is a flowchart 2500 of an example of operation of a smart flow system. The flowchart starts at module 2502 with receiving a Source UI selected by a user. A detailed view of the selected Source UI is rendered by the system at module 2504. The smart flow system deter mines at decision point 2506, if a CA entity is selected from source UI by the user. If it is determined No, dragging is disallowed at module 2508 (where the flowchart ends); if it is determined Yes, dragging of CA entity is initiated at module 2510. At decision point 2512 it is determined whether the CA entity is dropped at a CA executing target. If it is determined No, the flowchart ends at module 2514 with ignoring the action (where the flowchart ends); if it is determined Yes, the CA executing target into which a CA Entity from a Source UI was dropped is fetched at module 2516. The CA manager of the smart flow system segregates the CA entity at module 2518, curates the segregated CA entity at module 2520, and qualifies the curated CA entity at module 2522. At decision point 2524, the CA Manager checks a list of registered services (executable by CA executing target) for each CA entity with a CA Registry. If it is deter mined No, the check is ignored at module 2526 (where the flowchart ends). If it is determined. Yes, the CA manager checks with CA registry and, at decision point 2528, it is determined whether security permissions are allowed for the intended user to the corresponding CA Entity. If it is determined No, access is denied for the user at module 2530 (where the flowchart ends). If it is determined Yes, possible actions to CA entity are received from the CA registry at module 2532 and CA executing target is invoked to perform action pertaining to the CA Entity at module 2534 (where the flowchart ends).

Figure 26:
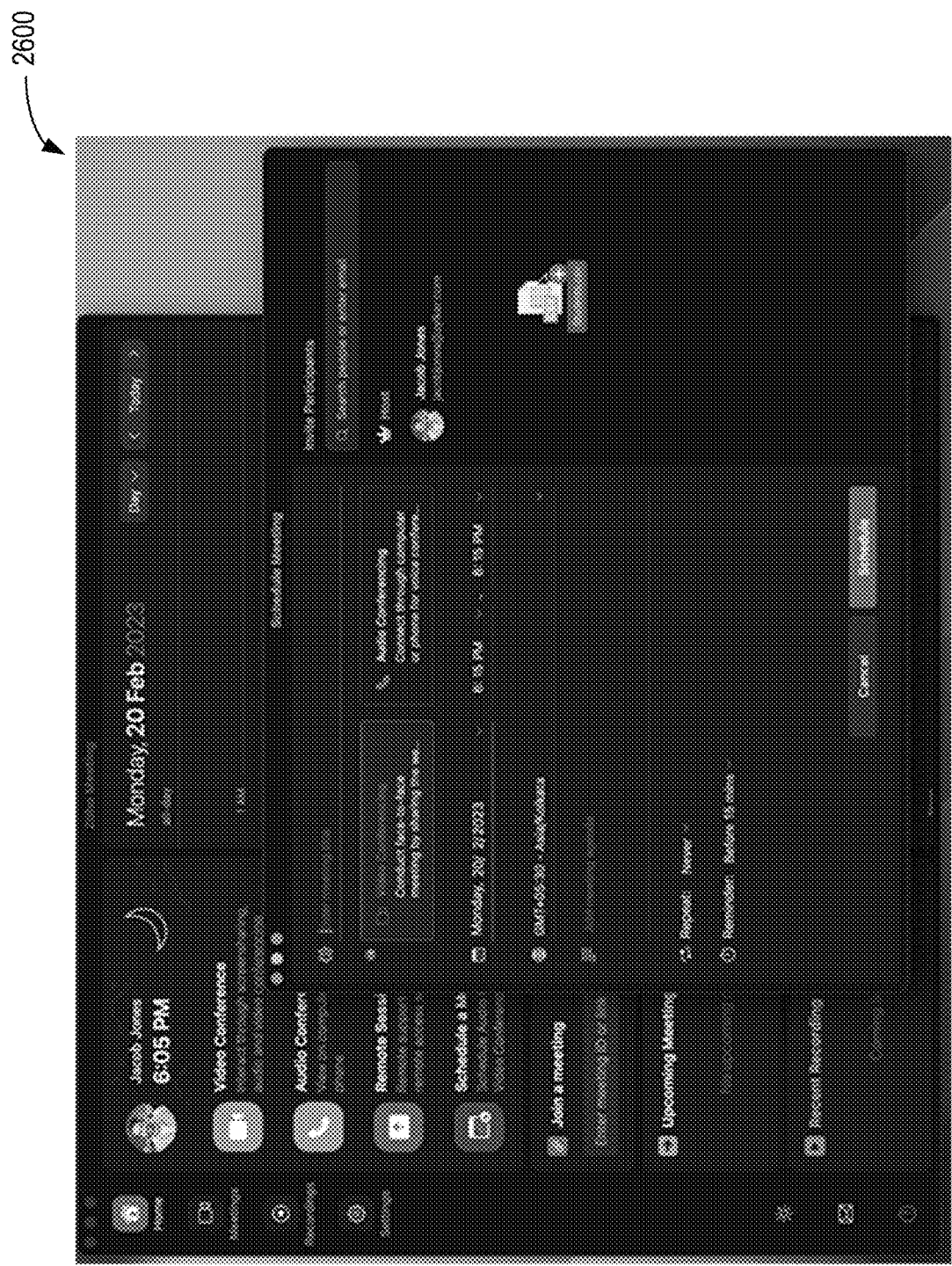
FIG. 26 is a screenshot illustrating a meeting app where the host is initiating to invite participants.
Figure 27:
FIG. 27 is a screenshot illustrating importing contacts from a file in an email app to a meeting app using smart flow.

Screenshots in FIGS. 26 and 27 illustrate importing contacts from a file available in an email application or workdrive and sending invitations to the email ids of the contacts in the file to participate in a meeting, using smart flow. As depicted in screenshot 2600 in FIG. 26, The host "Jacob Jones" is conducting a meeting via organization meeting app e.g., Zoho Meet. The host drags a CA entity e.g., ".csv" file from a source UI which can be an email or a workdrive. The host drops the file int a CA executing target, e.g., meeting app. Once the CA entity is dropped into the CA executing target, the smart flow system automatically extracts and imports the email ids from the dropped file onto the invite participants space of the meeting app as depicted in screenshot 2700 in FIG. 27. Once the participants are added to the invite participants list, meeting is scheduled by the host. The smart flow system extracts a file type CA entity intelligently. As an example, the engine imports only partial CA entity such as email ids of contacts in the CA entity ".csv" file, specific to a department or an organization. Thereby consuming the CA entity which is a CA entity ".csv" file here, partially. An added feature like a security check is performed on the CA entity ".csv" file by the smart flow system and organization specific contacts alone are filtered from the CA entity ".csv" file. A meeting invitation is then sent to the organization specific contacts.

In a specific implementation, the CA registry includes a list of registered services (executable by CA executing target) for each CA entity. Several use cases illustrating the services for different types of CA entity have been listed as follows:

A Source UI such as but not necessarily limited to mail, chat, contacts, streams, notes, tasks, calendar, etc. A CA Entity of different type includes but not necessarily limited to file type, contact or list of contacts type, date/time type, text or hyperlink type and geolocation type.

Examples for "file type" CA entity includes an incoming mail attachment, an inline image/video in a mail content, an uploaded file in a compose window, a file shared in a chat window, file attachments in stream posts or comments, attachments to a note, attachments for a task or its comments, attachments for a calendar event, a file uploaded to a workdrive, etc. Examples for "contact type" CA entity includes mail sender photo or email id, a user thumbnail in a opened chat window, a pinned chat thumbnail in chat bar, personal or organizational contact, contact with whom a note has been shared, contacts who have posted or commented, owners of tasks, an invitee of an event, etc. Examples for "list of contacts type" CA entity includes mail sender photo in mail details where the sender is a group email id, a group email id in compose window, a user thumbnail in a opened chat window corresponding to a group/channel, a pinned channel/group thumbnail in chat bar, a streams group, a contact group, a group of invitees from a calendar event, etc. Examples for "date/time type" CA entity includes date/time text in a mail/chat content, due date of a task, date/time mentioned in task title/description, date/time of a specific event, date/time mentioned in an event description, date/time rendered in various calendar views (like day view, week view, month view etc.), date/time mentioned in notes content, stream posts/comments, etc. Examples for "text/hyperlink type" CA entity includes text and/or hyperlinks selected from mail detail content, a chat window, a note, a task title or description, an event title or description, a streams post or comment, etc. Examples for "geolocation type" CA entity includes a geolocation string text in mail detail content, a geolocation string in a chat window content, a geolocation string in a notes content, a geolocation string in a task title or description, a geolocation string in an event title or description, a geo-location string in a stream's posts/comments etc.

A user can drag a desired CA entity and drop it on a CA executing target. CA executing targets includes but not limited to a workdrive file or folder, chat window, call button, ongoing audio/video call, meeting widget, calendar event attendee, notes, tasks, contacts, list of contacts, mail, calendar, tasks.

A File type CA entity such as an attachment in a mail module can be dragged and dropped into a chat window as an attachment (the window could be minimized or open). The file can also be dropped on pinned contacts in the chat bar to share the file to the contacts. The file can also be dropped on any entry in the chat menu in the widget section. An email attachment can be dragged and dropped into a "New Mail" button or compose window (minimized or open). When the file is dropped on the "New Mail" button in the toolbar a new compose window with the attachment is opened. A mail attachment can be uploaded to Workdrive as a file or in a specific folder. A mail attachment can be added as an attachment within a note (included in a popped-out window or in the widget section), or within a task (included in widget section), or within a Calendar event (included in widget section).

When a contact type CA entity such as a sender photo (or email id) from a mail module is dragged and dropped onto a work drive file or folder in the widgets section, the respective file or folder is shared with the sender. When a sender photo (or email id) from a mail module is dragged and dropped onto a chat window, the user is added to the respective chat channel/group. The chat window could be minimized or open. The sender photo (or email id) can be dropped on entries in chat launcher in widget to initiate a chat. The sender photo (or email id) from a mail module is dragged and dropped on the call history button in the global toolbar to initiate a call. The sender photo (or email id) from a mail module is dragged and dropped into an ongoing one-on-one or group call to invite the user as another participant. When the sender photo (or email id) from a mail module is dragged and dropped into the meeting widget, a meeting is started with the user. When the sender photo (or email id) from a mail module is dragged and dropped into a calendar event, the sender is invited as a participant for the event. When a sender photo (or email id) from a mail module is dragged and dropped on a task in widgets section, ownership of the task is assigned to the sender. When a sender photo (or email id) from a mail module is dragged and dropped on to the "New Mail" button in the global tool bar, a new mail is composed for the user. When a sender photo (or email id) from a mail module is dragged and dropped into the contacts widget, the user is added as a personal contact (more useful for non-organizational contacts).

When a group's email id or photo (also called as "profile picture") from a mail module is dragged and dropped onto a work drive file or folder in the widgets section, the respective file or folder is shared with the list of contacts in the group. When the group's email id or photo from a mail module is dragged and dropped onto a chat window, users in the group are added to the respective chat channel/group. The chat window could be minimized or open. The group's email id or photo can be dropped on the entries in chat launcher in widget to initiate a group chat. The group's email id or photo from a mail module is dragged and dropped on the call history button in the global toolbar to initiate a group call. The group's email id or photo from a mail module is dragged and dropped into an ongoing one-on-one or group call to invite the list of contacts in the group to participate in the call. When the group's email id or photo from a mail module is dragged and dropped into the meeting widget, a meeting is started with the list of contacts in the group. When the group's email id or photo from the mail module is dragged and dropped into a calendar event, the list of contacts in the group are invited as participants for the event. When the group's email id or photo from the mail module is dragged and dropped into a note in the widgets section, the note is shared with the list of contacts in the group. User can drag a group's email id or photo from mail details view (or email id) on to the "New Mail" button in the global tool bar to compose a new mail to the group email id.

When a date or date/time text type CA Entity from a mail module is dropped on to the calendar widget a new event is created (with the email sender as an attendee). When the date or date/time text from the mail module is dropped on to the calendar module icon (either on the left or top), a new entry is created (with the email sender as an attendee). Dropping a date or date/time text from the mail module on to the meeting widget schedules a meeting with the email sender.

A text and/or hyperlinks type CA entity selected from an incoming mail can be dragged and dropped into a chat window, or into any of the list entries in chat widget, or onto a pinned contact in chat bar. When the text and/or hyperlinks type CA entity selected from an incoming mail is dragged and dropped into a particular note or on the "+" button then a new note is created with the selected text or hyperlink. The text and/or hyperlinks type CA entity selected from an incoming mail is dragged and dropped onto the "New Mail" button in the global toolbar to open a new compose window with the selected Text or Hyperlink. When the text and/or hyperlinks type CA entity dropped into an already open or minimized compose window, the selected text and/or hyperlink will be appended to the mail content. The text and/or hyperlinks selected from an incoming mail is dragged and dropped on a particular task to add it as a description or on the "+" button to create a new task using that text as title. When the text and/or hyperlinks selected from an incoming mail is dragged and dropped onto a calendar event, to add it as a description for the event or on the "+" button in the widget, a new event with selected text as title is created in the calendar.

When a geolocation type CA entity is dragged from the mail module and dropped on the CA executing target, e.g. calendar widget a new event is created at the specified location (with the email sender as an attendee). When a geolocation type CA entity is dragged from the mail module and dropped on the CA executing target, e.g. calendar module icon (either on the left or top) an event is created at the specified location (with the email sender as an attendee).

Figure 28:
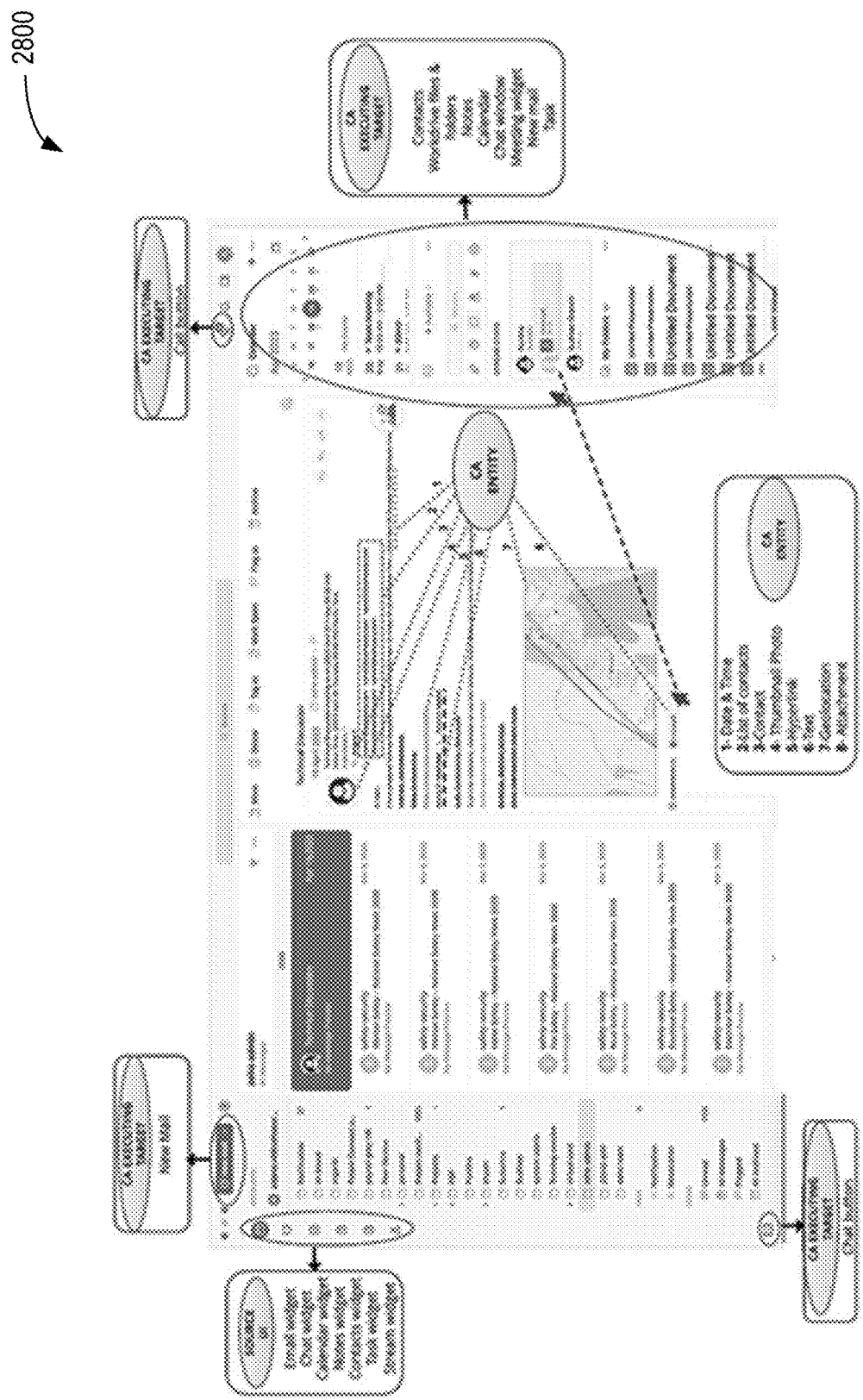
FIG. 28 is a screenshot illustrating CA Executing Target and CA Entity for an incoming email (Source UI).

As an example, FIG. 28 is a diagram 2800 illustrating CA executing target and CA entity for an incoming email (Source UI). In the incoming mail (Source UI), new mail option, call button, chat button, contacts, workdrive files & folders, notes, calendar, chat window, meeting widget and task are CA executing target. Date & time, list of contacts, contact, sender thumbnail photo, hyper link, text, geolocation, attachment in the incoming email are CA entities.

Figure 29:
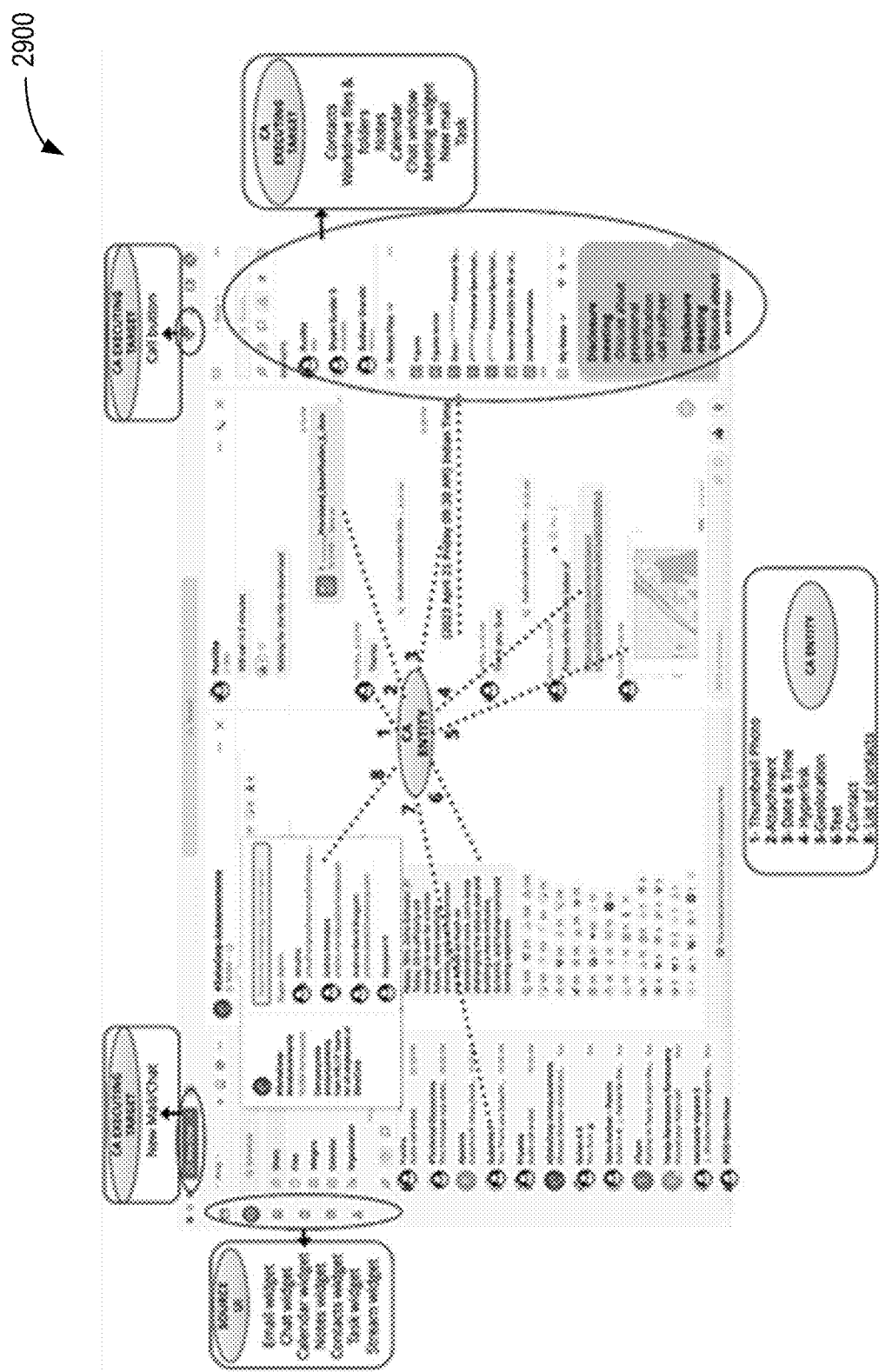
FIG. 29 is a screenshot illustrating CA Executing Target and CA Entity for a chat service (Source UI).

As an example, FIG. 29 is a diagram 2900 illustrating CA executing target and CA entity for a chat service (Source Up. In the chat (Source new chat option, call button, contacts, workdrive files & folders, notes, calendar, chat window, meeting widget and task are CA executing targets. Date & time, list of contacts, contact, user thumbnail photo, hyper link, text, geolocation, attachment in the chat are CA entities.

Figure 30:
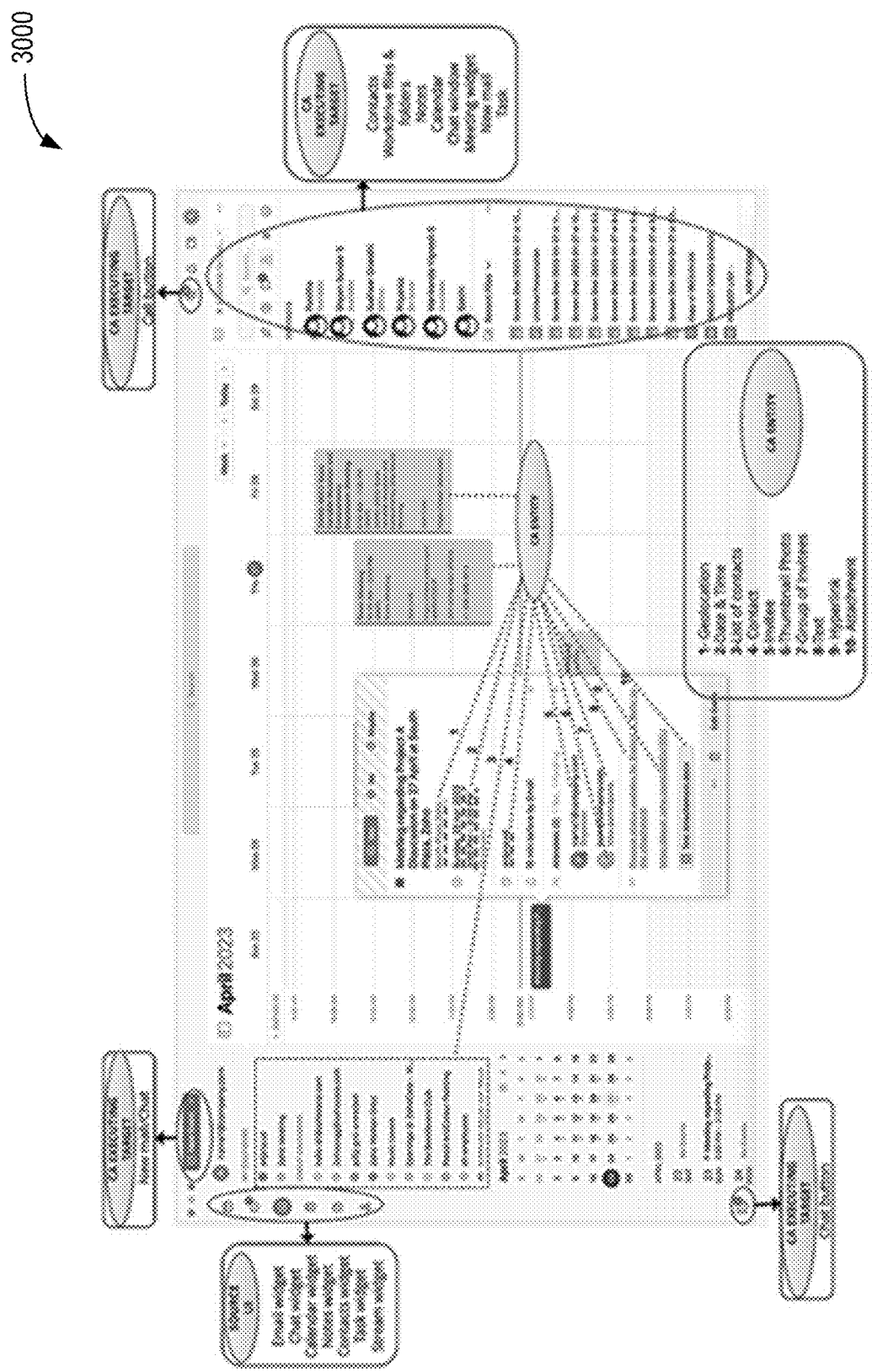
FIG. 30 is a screenshot illustrating CA Executing Target and CA Entity for a calendar service (Source UI).

As an example, FIG. 30 is a diagram 3000 illustrating CA executing target and CA entity for a calendar service (Source UI). In the calendar invite (Source UI), new mail/chat option, call button, chat button, contacts, workdrive files & folders, notes, calendar, chat window, meeting widget and task are CA executing target. Date & time, list of contacts, contact, user thumbnail photo, hyper link, text, geolocation, attachment, invitee, group of invitees in the calendar invite are CA entities.

What is claimed is:
1. A system comprising:
 a smart assistant engine, including a named entity recognition engine and a multi-service command execution engine, configured to process input associated with a user and generate an action menu from which action items can be selected from a smart assistant view by the user;
a unified software suite user interface coupled to the smart assistant engine;
a software service ecosystem coupled to the smart assistant engine;
wherein, in operation,
the smart assistant engine generates the action menu at runtime based on the input and the action items correspond to actions that can be performed across multiple services of the software service ecosystem;
the input includes a string selected from a group consisting of a phrase, a command string, and a combination of these;
when the input includes the phrase, the smart assistant engine contextually projects from the input at least one action associated with at least one of the action items from the phrase;
the named entity recognition engine recognizes from the input one or more command specific options in association with one or more of the action items to map an intention of the user across the multiple services of the software service ecosystem and generate multiple actions across the multiple services;
when a connected action selection is received from the unified software suite user interface, the multi-service command execution engine executes a corresponding one or more commands associated with the connected action selection.

2. The system of claim 1 comprising a smart assistant registry datastore coupled to the smart assistant engine.

3. The system of claim 1, wherein when the input includes the phrase, the input is processed using a natural language processor and a natural language processing module that recognizes at least one action associated with at least one of the action items from the phrase.

4. The system of claim 1, wherein the smart assistant engine has a command center mode that is entered if the input is initiated with a specific alphanumeric symbol and includes a command string with a set of parameters; wherein suitable parameters are suggested by the smart assistant engine through the unified software suite user interface.

5. The system of claim 1, wherein the smart assistant engine has a bookmark mode that is entered by invoking bookmark centric commands.

6. The system of claim 1, wherein the smart assistant engine has an action center mode that is entered if the input includes an action keyword and a contact.

7. The system of claim 1, wherein the smart assistant engine processes a command line utility that helps the user view information or execute one or more actions across various services of the software service ecosystem based on the user input.

8. The system of claim 1, wherein the smart assistant engine interprets the user input and classifies its process execution based on a mode selected from a group consisting of command center mode, bookmark center mode, and action center mode.

9. The system of claim 1, wherein, in operation, the smart assistant engine executes commands in command center mode, bookmark center mode, and action center mode.

10. The system of claim 1, wherein commands are executed if the user and one or more human agents have permission.

11. The system of claim 1, wherein the named entity recognition engine maps security permissions applied to a service corresponding to the user and a contact.

12. A method comprising:
processing input associated with a user, the input including a string selected from a group consisting of a phrase, a command string, and a combination of these;
generating an action menu from which action items can be selected from a smart assistant view by the user, the action items corresponding to actions that can be performed across multiple services of a software service ecosystem;
when the input includes the phrase, contextually projecting from the input at least one action associated with at least one of the action items from the phrase;
recognizing one or more command specific options in association with one or more of the action items to map an intention of the user across the multiple services of the software service ecosystem and generate multiple actions across the multiple services;
when a connected action selection is received, executing a corresponding one or more commands associated with the connected action selection.

13. The method of claim 12, wherein when the input includes the phrase, the input is processed using a natural language processor and a natural language processing module that recognizes at least one action associated with at least one of the action items from the phrase.

14. The method of claim 12, wherein if the input is initiated with a specific alphanumeric symbol and includes a command string with a set of parameters, the method comprises suggesting suitable parameters.

15. The method of claim 12 comprising invoking bookmark centric commands to enter a bookmark mode.

16. The method of claim 12, wherein if the input includes an action keyword and a contact, the method comprises entering an action center mode.

17. The method of claim 12 comprising processing a command line utility that helps the user view information or execute one or more actions across various services of the software service ecosystem based on the user input.

18. The method of claim 12 comprising interpreting the user input and classifying its process execution based on a mode selected from a group consisting of command center mode, bookmark center mode, and action center mode.

19. The method of claim 12 comprising executing commands in command center mode, bookmark center mode, and action center mode.

20. The method of claim 12, wherein if the user and one or more human agents have permission, the method comprises entering commands.

21. The method of claim 12 comprising mapping security permissions applied to a service corresponding to the user and a contact.

22. A system comprising:
means for processing input associated with a user, the input including a string selected from a group consisting of a phrase, a command string, and a combination of these;
means for generating an action menu from which action items can be selected from a smart assistant view by the user, the action items corresponding to actions that can be performed across multiple services of a software service ecosystem;

means for, when the input includes the phrase, contextually projecting from the input at least one action associated with at least one of the action items from the phrase;

means for recognizing one or more command specific options in association with one or more of the action items to map an intention of the user across the multiple services of the software service ecosystem and generate multiple actions across the multiple services;

means for, when a connected action selection is received, executing a corresponding one or more commands associated with the connected action selection.

* * * * *